US011449401B2

(12) United States Patent
Patnaik et al.

(10) Patent No.: US 11,449,401 B2
(45) Date of Patent: *Sep. 20, 2022

(54) MOVING A CONSISTENCY GROUP HAVING A REPLICATION RELATIONSHIP

(71) Applicant: NetApp Inc., Sunnyvale, CA (US)

(72) Inventors: Pranab Patnaik, Cary, NC (US); Nagender Somavarapu, Sunnyvale, CA (US); Yuedong Mu, San Jose, CA (US); Rithin Kumar Shetty, Sunnyvale, CA (US); Devang Kundanlal Shah, San Jose, CA (US)

(73) Assignee: NetApp Inc., San Jose, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/806,110

(22) Filed: Mar. 2, 2020

(65) Prior Publication Data

US 2020/0201725 A1 Jun. 25, 2020

Related U.S. Application Data

(63) Continuation of application No. 15/142,186, filed on Apr. 29, 2016, now Pat. No. 10,621,058.

(51) Int. Cl.
*G06F 11/20* (2006.01)
*G06F 11/14* (2006.01)

(52) U.S. Cl.
CPC ...... *G06F 11/2094* (2013.01); *G06F 11/1441* (2013.01); *G06F 11/2097* (2013.01)

(58) Field of Classification Search
CPC .................................................. G06F 11/2094
See application file for complete search history.

(56) References Cited

U.S. PATENT DOCUMENTS

| 9,135,120 | B1* | 9/2015 | Natanzon | G06F 11/1456 |
|---|---|---|---|---|
| 2013/0103650 | A1* | 4/2013 | Natanzon | G06F 11/2069 707/684 |
| 2014/0279920 | A1 | 9/2014 | Madhavarapu et al. | |
| 2015/0149999 | A1* | 5/2015 | Ramanathan | G06F 9/4856 718/1 |
| 2016/0110283 | A1* | 4/2016 | Iyigun | G06F 12/0842 711/130 |
| 2017/0270012 | A1* | 9/2017 | Tarasuk-Levin | H04L 67/1095 |
| 2017/0315874 | A1 | 11/2017 | Patnaik et al. | |

* cited by examiner

*Primary Examiner* — Van H Oberly
(74) *Attorney, Agent, or Firm* — Cooper Legal Group, LLC

(57) ABSTRACT

One or more techniques and/or computing devices are provided for moving a consistency group having a replication relation. For example, a first consistency group of storage objects (e.g., files, logical unit numbers (LUNs), etc.) within first storage may have a replication relationship with a second consistency group within second storage (e.g., the second consistency group is maintained as a synchronously replicated copy of the first consistency group). A volume copy operation, a single file move on demand command, a single file restore command, or other functionality is used to move the first consistency group from the first storage to third storage, such as for load balancing, to create a moved first consistency group within the third storage. A new replication relationship is established between the moved first consistency group and the second consistency group, and the moved first consistency group and the second consistency group are resynchronized.

20 Claims, 25 Drawing Sheets

MOVING A CONSISTENCY GROUP HAVING A REPLICATION RELATIONSHIP

RELATED APPLICATIONS

This application claims priority to and is a continuation of U.S. application Ser. No. 15/142,186, filed on Apr. 29, 2016, now allowed, titled "MOVING A CONSISTENCY GROUP HAVING A REPLICATION RELATIONSHIP," which is incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical replication, the storage device, comprising the replicated data, is owned by the first storage controller until a failover/switchover to the second storage controller occurs.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data can be provided using a synchronous replicated copy of a primary storage object. The high availability to data may be provided through a software defined architecture, using synchronous replication, and is not limited to merely two storage controllers.

Various replication and synchronization techniques may be used to replicate data (e.g., client data), configuration data (e.g., a size of a volume, a name of a volume, logical unit number (LUN) configuration data, etc.), and/or write caching data (e.g., cached write operations not yet flushed to a storage device, but cached within memory such as a non-volatile random access memory (NVRAM)) between storage controllers and/or storage devices. Synchronous replication may be used where an incoming write operation to the first storage controller is locally implemented upon a first storage object (e.g., a file, a LUN, a LUN spanning multiple volumes, or any other type of object) by the first storage controller and remotely implemented upon a second storage object (e.g., maintained as a fully synchronized copy of the first storage object) by the second storage controller before an acknowledgement is provided back to a client that sent the incoming write operation. In another example, asynchronous replication may be achieved by capturing snapshots of a volume, determining data differences (e.g., deltas) between a current snapshot and a last snapshot used to replicate data to the second storage object, and using incremental transfers to send the data differences to the second storage controller for implementation upon the second storage object. Semi-synchronous replication may be achieved where an acknowledgment back to a client for a write request is based upon local implementation upon the first storage object, but is not dependent upon remote implementation upon the second storage object.

Storage I/O performance and synchronous data protection are important to clients. I/O performance may be improved by non-disruptively moving storage items from one storage to another storage, such as to a new storage aggregate with faster storage media and/or newer, faster, and/or less loaded storage controllers. In this way, load and/or capacity balancing may be achieved. Unfortunately, moving storage items can affect client access to data and/or negatively impact a recovery point objective (RPO) because storage items may not be synchronously replicated during various stages of being moved. Accordingly, there is a need for non-disruptively moving storage items at an arbitrary level of granularity with minimal impact upon RPO.

DETAILED DESCRIPTION

Figure 1:
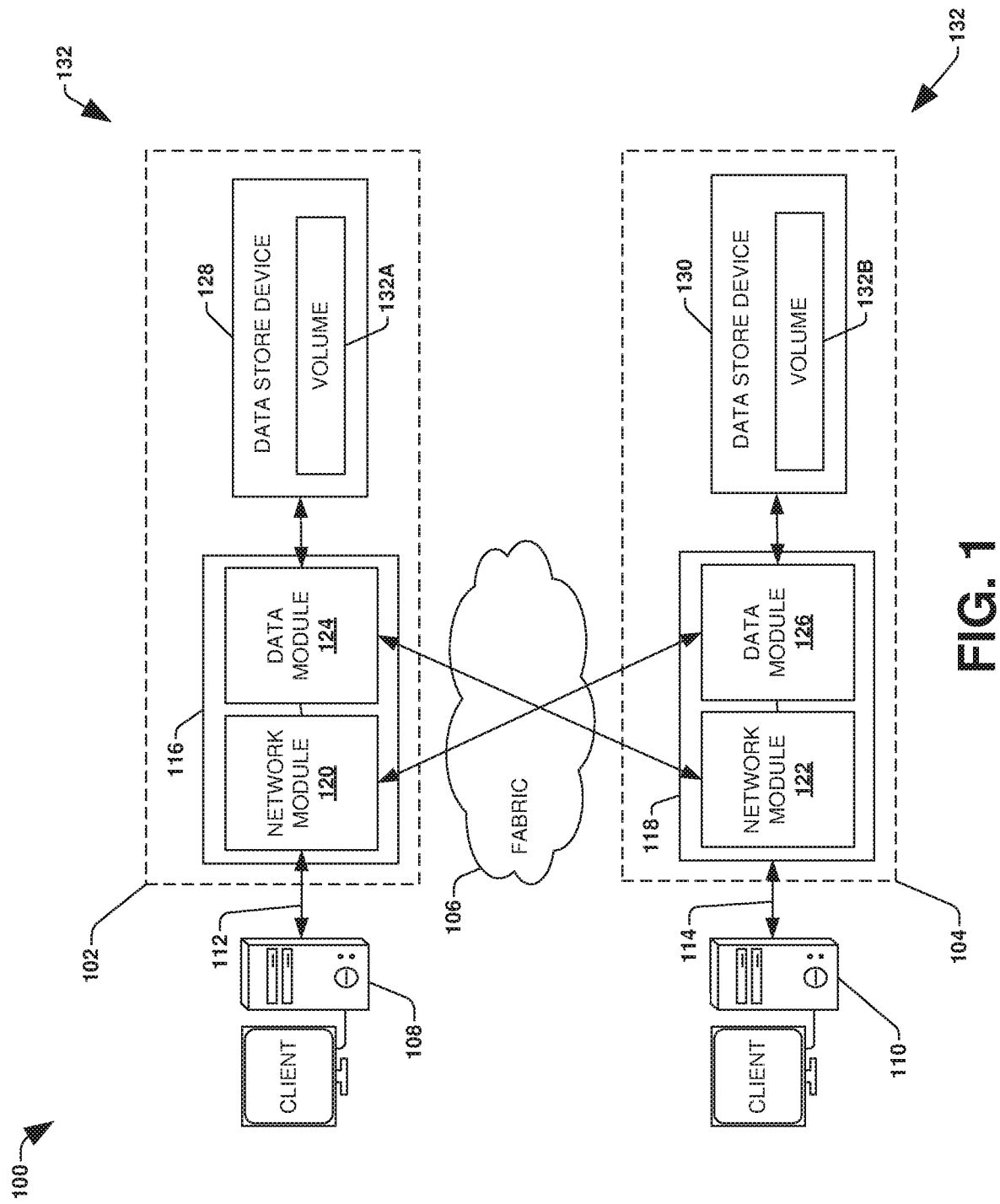
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for moving a consistency group having a replication relation are provided herein. In an example, a volume move operation may be performed to move a consistency group, having a replication relationship, from a first volume to a second volume with little to no recovery point objective (RPO) loss because late cutover of client access is provided after the entire consistency group has been moved. In another example, a storage controller or an external plugin may utilize storage item move functionality (e.g., a single file move on demand (SFMOD) command) and a rebaseline technique to move a consistency group from first storage to second storage with improved granularity (e.g., movement of merely the storage items within the consistency group as opposed to an entire volume) but with additional overhead due to rebaselining.

In another example, a storage controller or an external plugin may utilize single storage item restore functionality (e.g., a single file restore (SFR) command) and storage item move functionality (e.g., a single file move on demand (SFMOD) command) to move a consistency group from first storage to second storage with improve granularity and reduced RPO outage but with later cutover that results in more outage of a synchronous replication relationship. In another example, storage item move functionality (e.g., a single file move on demand (SFMOD) command) may be used with a transfer of a sync cache, an inflight tracker, and/or a dirty region log to move a consistency group, such as a cross volume consistency group, from first storage to second storage with little to no RPO outage. In this way, various consistency group move operations may be performed based upon group atomicity, file atomicity, early cutover (e.g., moving client workload to a destination as quickly as possible), minimizing RPO outage, granularity (e.g., support the movement of a consistency group comprising an arbitrarily level of granularity such as a file granularity, a LUN granularity, a subvolume granularity, etc.), and/or avoiding rebaselining.

To provide context for moving a consistency group having a replication relation, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network moduless 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that moving a consistency group having a replication relation may be implemented within the clustered network environment 100. In an example, the node 116 (e.g., a first storage controller) may host a first consistency group within volume 132A. The first consistency group may have a replication relationship, such as a synchronous replication relationship, with a second consistency group within volume 132B. The first consistency group may be moved from the volume 132A to another volume to create a moved first consistency group. The moved first consistency group may be resynchronized with a new replication relationship with the second consistency group. It may be appreciated that moving a consistency group having a replication relation may be implemented for and/or between any type of computing environment, and may be transferable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
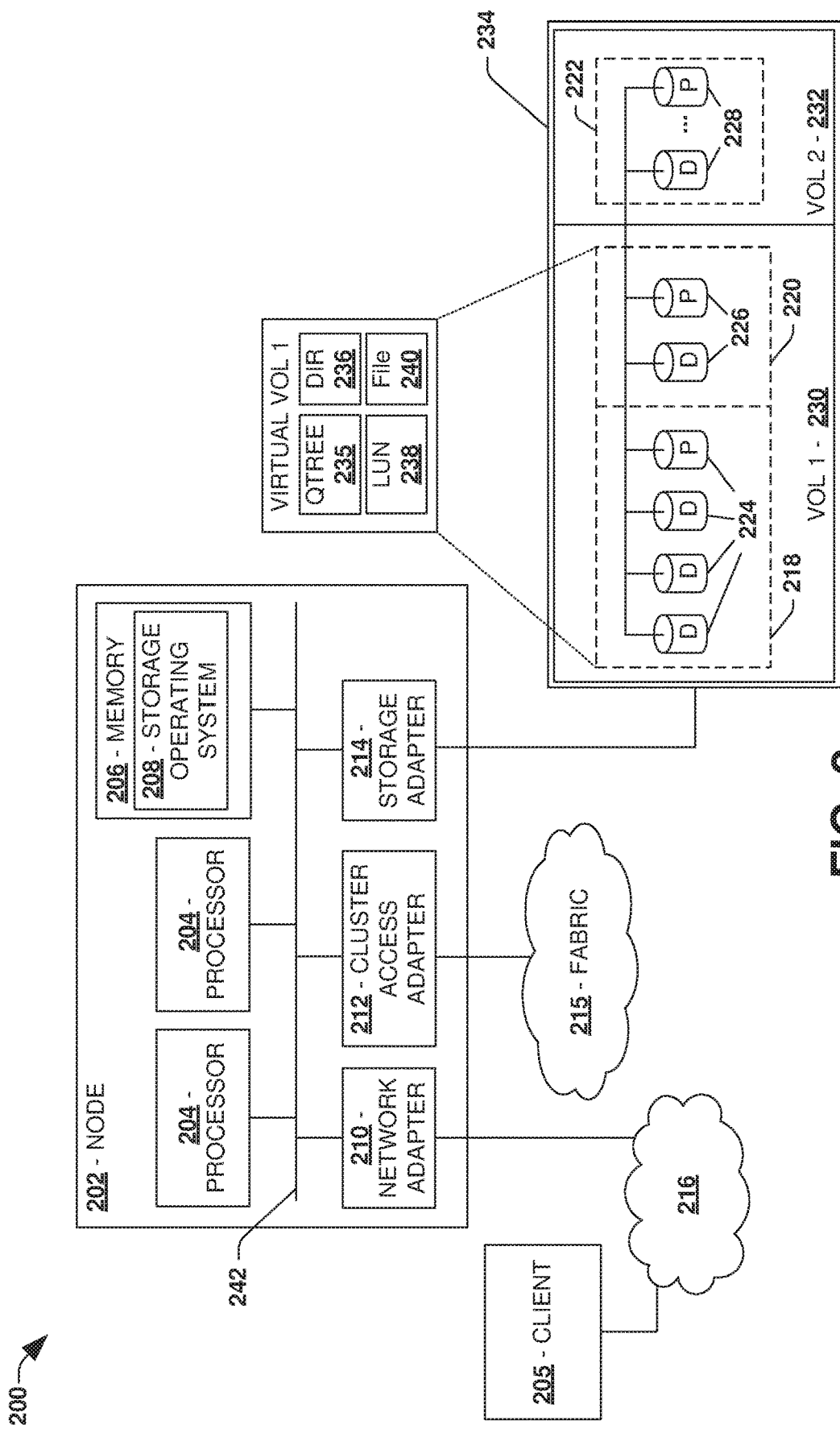
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that moving a consistency group having a replication relation may be implemented for the data storage system 200. In an example, the node 202 (e.g., a first storage controller) may host a first consistency group within volume 230. The first consistency group may have a replication relationship, such as a synchronous replication relationship, with a second consistency group within a second volume. The first consistency group may be moved from the volume 230 to another volume to create a moved first consistency group. The moved first consistency group may be resynchronized with a new replication relationship with the second consistency group. It may be appreciated that moving a consistency group having a replication relation may be implemented for and/or between any type of computing environment, and may be transferable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

In one embodiment of moving a consistency group having a replication relation, a volume move operation is utilized. For example, a first consistency group (e.g., files or LUNs associated with a virtual machine) may be stored within a first volume. The first consistency group may have a replication relationship, such as a synchronous replication relationship, with a second consistency group (e.g., the second consistency group may comprise replicated copies of the files and/or LUNs associated with the virtual machine) within a second volume. In an example of synchronous replication, incoming operations, targeting the first consistency group, may be locally implemented upon the first consistency group and split into replicated operations that are remotely implemented upon the second consistency group before such operations are acknowledged back to clients that sent the operations. A volume move operation may be performed upon the first volume in order to move the first consistency group to a new location. The volume move operation may move the first consistency group and any snapshots of the first consistency group. Once all of the data is moved to the new location, then a resynchronization is performed (e.g., utilizing the snapshots) to bring the moved first consistency group into sync with the second consistency group. The volume move operation provides little to no RPO loss but does not provide granular movement of merely the first consistency group (e.g., other files and/or LUNs within the first volume are also moved).

Figure 3:
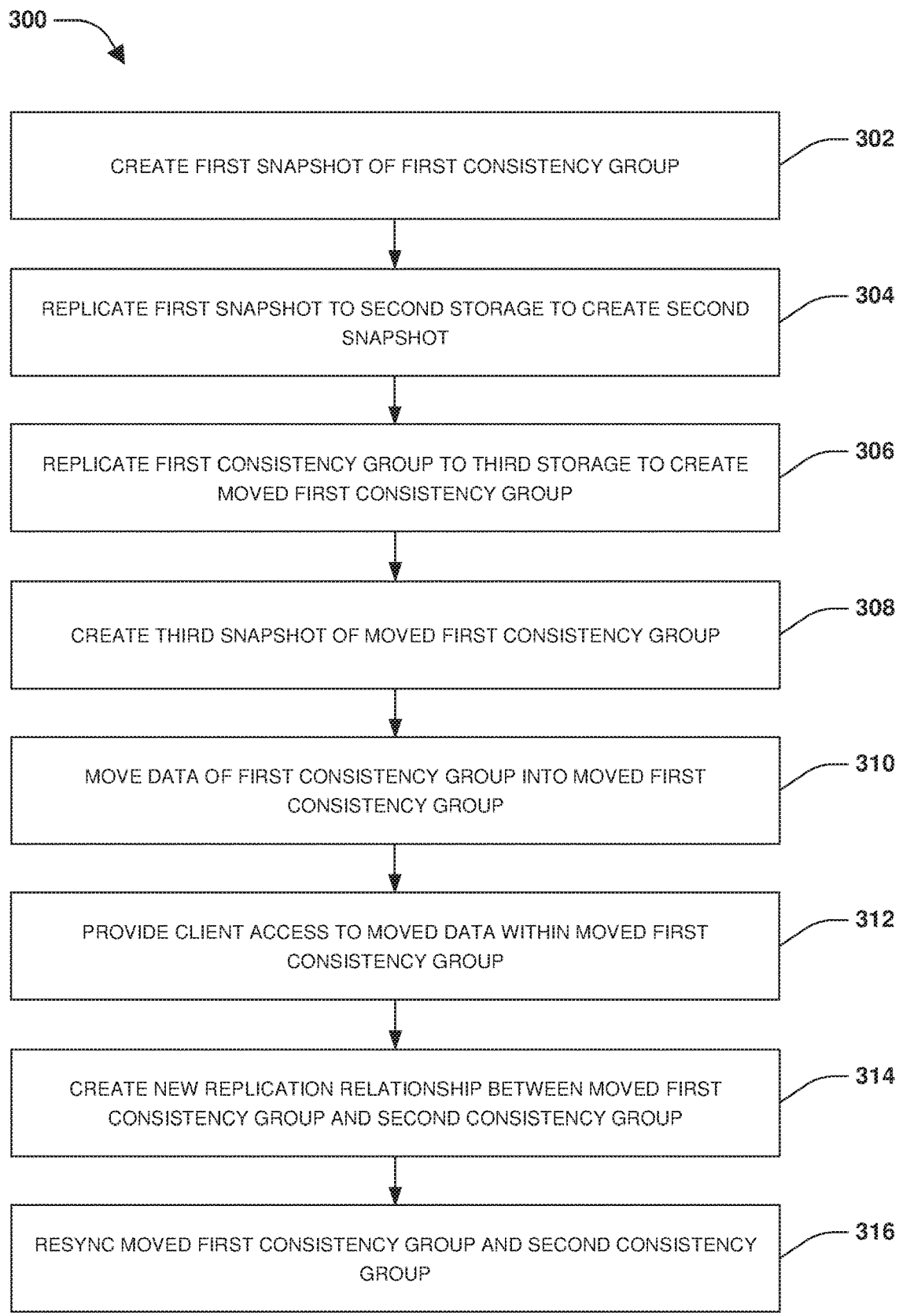
FIG. 3 is a flow chart illustrating an exemplary method of moving a consistency group having a replication relation.

One embodiment of moving a consistency group having a replication relation is illustrated by an exemplary method 300 of FIG. 3. A first consistency group of storage items (e.g., one or more files or LUNs within a volume, within one or more directories of the volume, spanning multiple volumes, or spanning multiple storage controllers) may be hosted within first storage. The first consistency group may have a replication relationship, such as a synchronous replication relationship, with a second consistency group (e.g., the second consistency group may comprise synchronously replicated copies of the files and/or LUNs within the first consistency group) within second storage (e.g., storage hosted by a remote disaster recovery storage controller that is within a different location than a storage controller hosting the first storage). In an example of synchronous replication, an operation (e.g., a client write operation), targeting a storage item within the first consistency group, may be received from a client. The operation may be split into a replicated operation based upon the replication relationship. The operation may be locally implemented upon the storage item within the first storage (e.g., locally implemented by the storage controller hosting the first storage). The replicated operation may be remotely implemented upon a replicated storage item (e.g., a mirrored copy of the storage item), of the second consistency group, within the second storage (e.g., the remote storage controller may implement the replicated operation upon the replicated storage item). Responsive to both the operation and the replicated operation completing, the operation may be acknowledged back to the client. In this way, the storage item and the replicated storage item have the same data before the operation is acknowledged.

It may be desirable to move the first consistency group from the first storage to third storage, such as for load or capacity balancing. Accordingly, a first snapshot of the first consistency group may be created, at 302. At 304, the first snapshot may be replicated to the second storage, based upon the replication relationship, to create a second snapshot within the second storage. At 306, single storage item restore functionality (e.g., a single file restore (SFR) command) may be utilized to replicate the first consistency group to the third storage to create a moved first consistency group within the third storage. At 308, a third snapshot of the moved first consistency group may be created at the third storage.

At 310, storage item move functionality (e.g., a single file move on demand (SFMOD) command) may be utilized to move data of the first consistency group into the moved first consistency group. In an example, the third snapshot may be used as a reference for the storage item move functionality. In another example, responsive to a data block, within an active file system of the first storage, remaining unchanged after the first snapshot was created, a corresponding data block may be utilized from the third snapshot within the third storage for populating the moved first consistency group. Responsive to the data block being changed after the first snapshot was created, the data block may be sent from the active file system of the first storage to the third storage for populating the moved first consistency group. At 312, as data is moved into the moved first consistency group, client access may be provided to the moved data.

At 314, a new replication relationship may be created between the moved first consistency group and the second consistency group. In an example, the replication relationship between the first consistency group and the second consistency group may be deleted. At 316, a resynchronization between the moved first consistency group and the second consistency group may be performed using the second snapshot and the third snapshot (e.g., data differences may be synchronized between the moved first consistency group and the second consistency group) so that the moved first consistency group and the second consistency group comprise the same data and have a synchronous replication relationship. For example, the second snapshot and the third snapshot may be used as common snapshots for the resynchronization, and thus may be used to determine what data is the same or different between the moved first consistency group and the second consistency group. Responsive to resynchronizing the moved first consistency group and the second consistency group, the first snapshot, the second snapshot, and the third snapshot may be deleted.

After resynchronization, synchronous replication may be provided based upon the new replication relationship. For example, an operation, targeting a moved storage item within the moved first consistency group, may be received from a client. The operation may be split into a replicated operation based upon the new replication relationship. The operation may be locally implemented upon the moved storage item within the third storage. The replicated operation may be remotely implemented upon a replicated storage item (e.g., a mirrored copy of the storage item), of the second consistency group, within the second storage. Responsive to both the operation and the replicated operation completing, the operation may be acknowledged back to the client.

In an example, the single storage item restore functionality and the storage item move functionality may be utilized to move the second consistency group from the second storage to fourth storage as a moved second consistency group (e.g., utilizing similar techniques as how the first consistency group was moved to the third storage). A second new replication relationship between the moved first consistency group and the moved second consistency group or between the first consistency group (e.g., if the first consistency group was never moved) and the moved second consistency group may be created. A resynchronization may be performed between the moved first consistency group and the moved second consistency group or between the first consistency group (e.g., if the first consistency group was never moved) and the moved second consistency group.

Figure 4A:
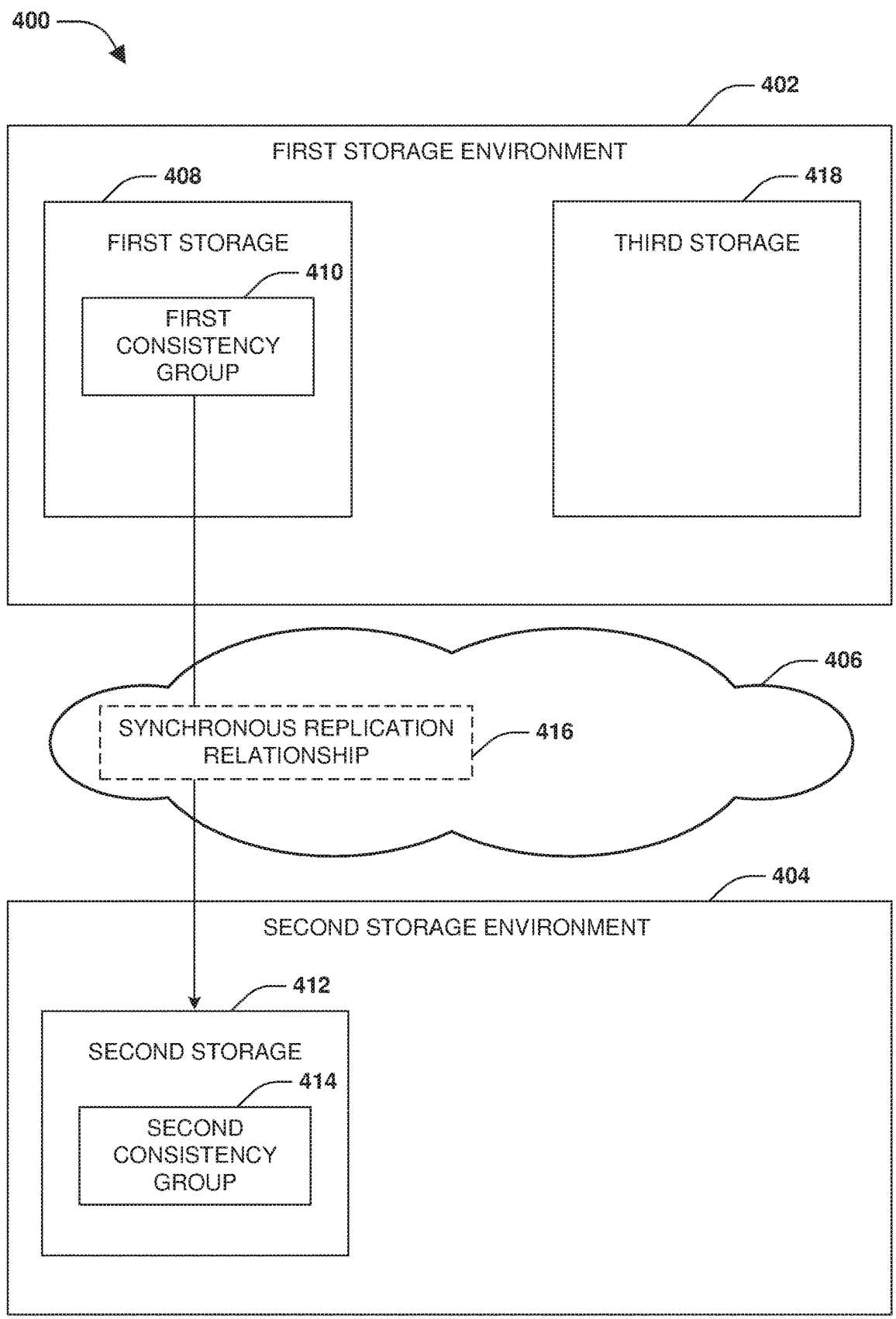
FIG. 4A is a component block diagram illustrating an exemplary computing device for moving a consistency group having a replication relation.

FIGS. 4A-4G illustrate examples of a system 400 for moving a consistency group having a replication relation. FIG. 4A illustrates a first storage environment 402 (e.g., a first data center, a first storage controller, a first cluster of storage controllers, etc.) comprising first storage 408, third storage 418, and/or other storage (e.g., volumes, storage aggregates, storage media, etc.). The first storage 408 may comprise a first consistency group 410 (e.g., one or more files or LUNs within a volume, one or more directories of the volume, across multiple volumes, etc.). The first consistency group 410 may have a synchronous replication relationship 416 with a second consistency group 414 (e.g., the second consistency group 414 may comprise synchronously replicated copies of the files or LUNs within the first consistency group 410) hosted within second storage 412 comprised within a second storage environment 404 accessible to the first storage environment 402 over a network 406.

Figure 4B:
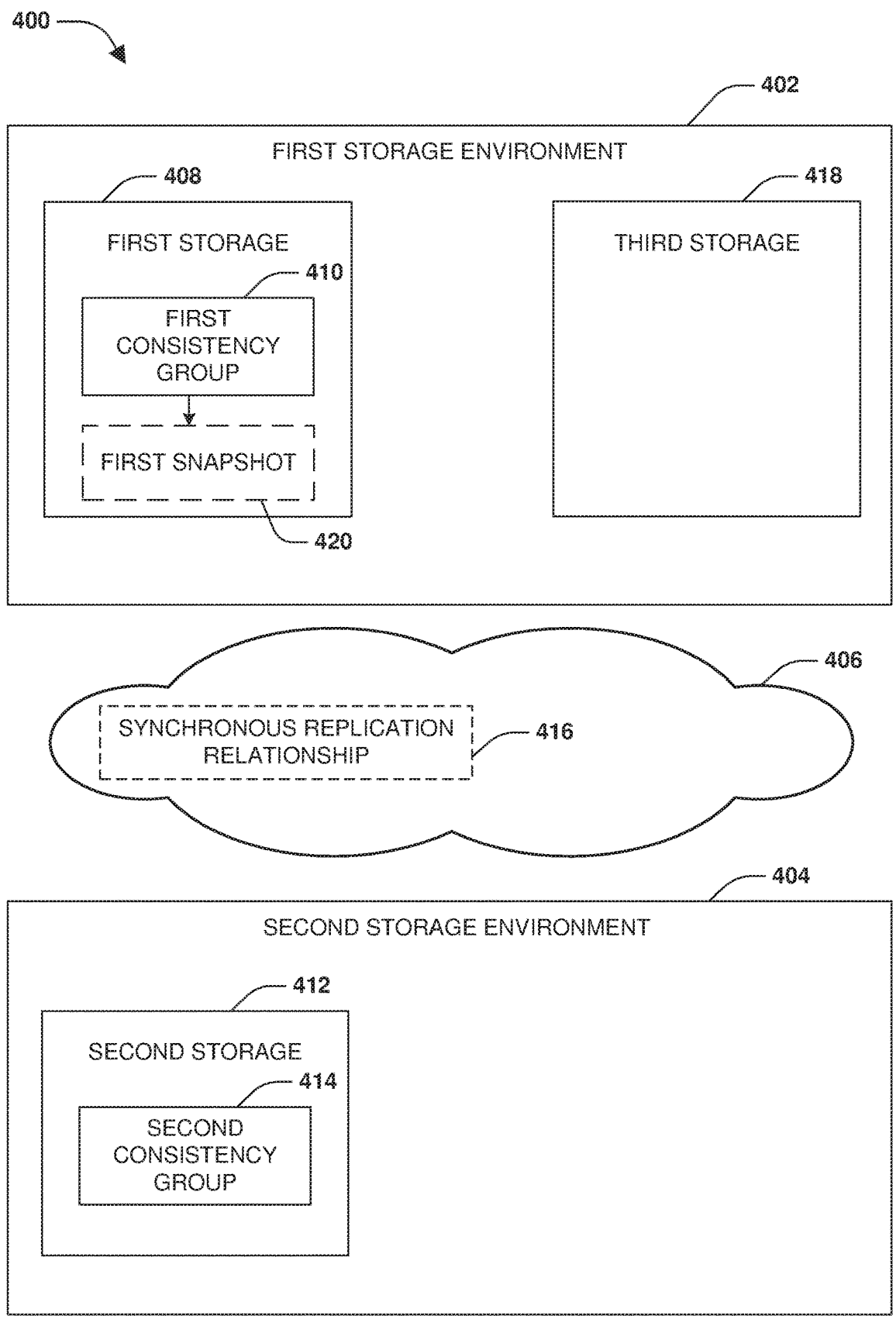
FIG. 4B is a component block diagram illustrating an exemplary computing device for moving a consistency group having a replication relation, where a first snapshot is created of a first consistency group.
Figure 4C:
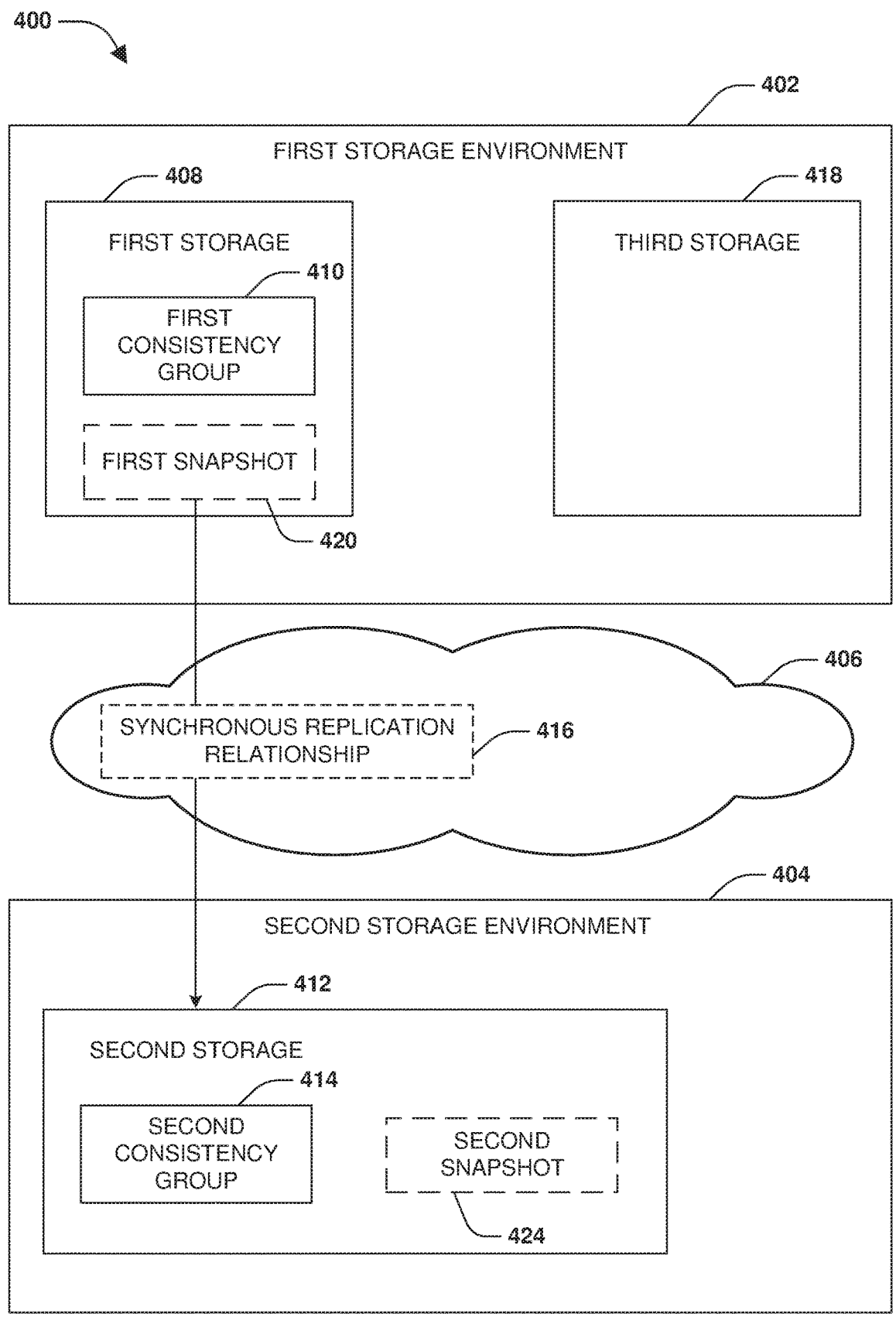
FIG. 4C is a component block diagram illustrating an exemplary computing device for moving a consistency group having a replication relation, where a first snapshot is replicated to second storage.

It may be desirable, such as for capacity or load balancing, to move the first consistency group 410 from the first storage 408 to the third storage 418. Accordingly, a first snapshot 420 of the first consistency group 410 may be created, as illustrated in FIG. 4B. The first snapshot 420 may comprise a persistent point-in-time representation of the first consistency group 410. FIG. 4C illustrates the first snapshot 420 being replicated to the second storage 412 to create a second snapshot 424. In an example, the first snapshot 420 and the second snapshot 424 may be common snapshots (e.g., capture the same point-in-time representation of data).

Figure 4D:
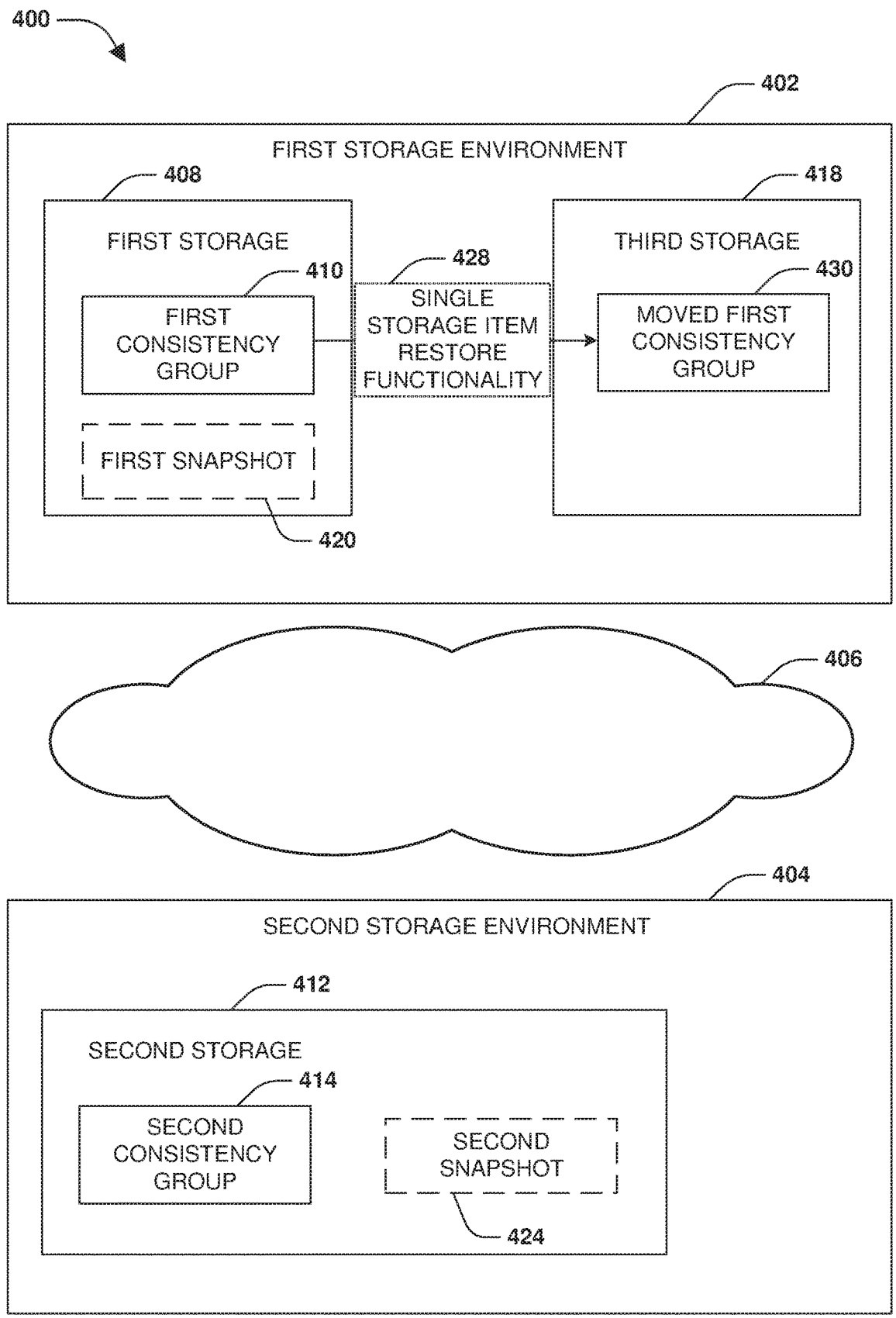
FIG. 4D is a component block diagram illustrating an exemplary computing device for moving a consistency group having a replication relation, where a first consistency group is moved to third storage.
Figure 4E:
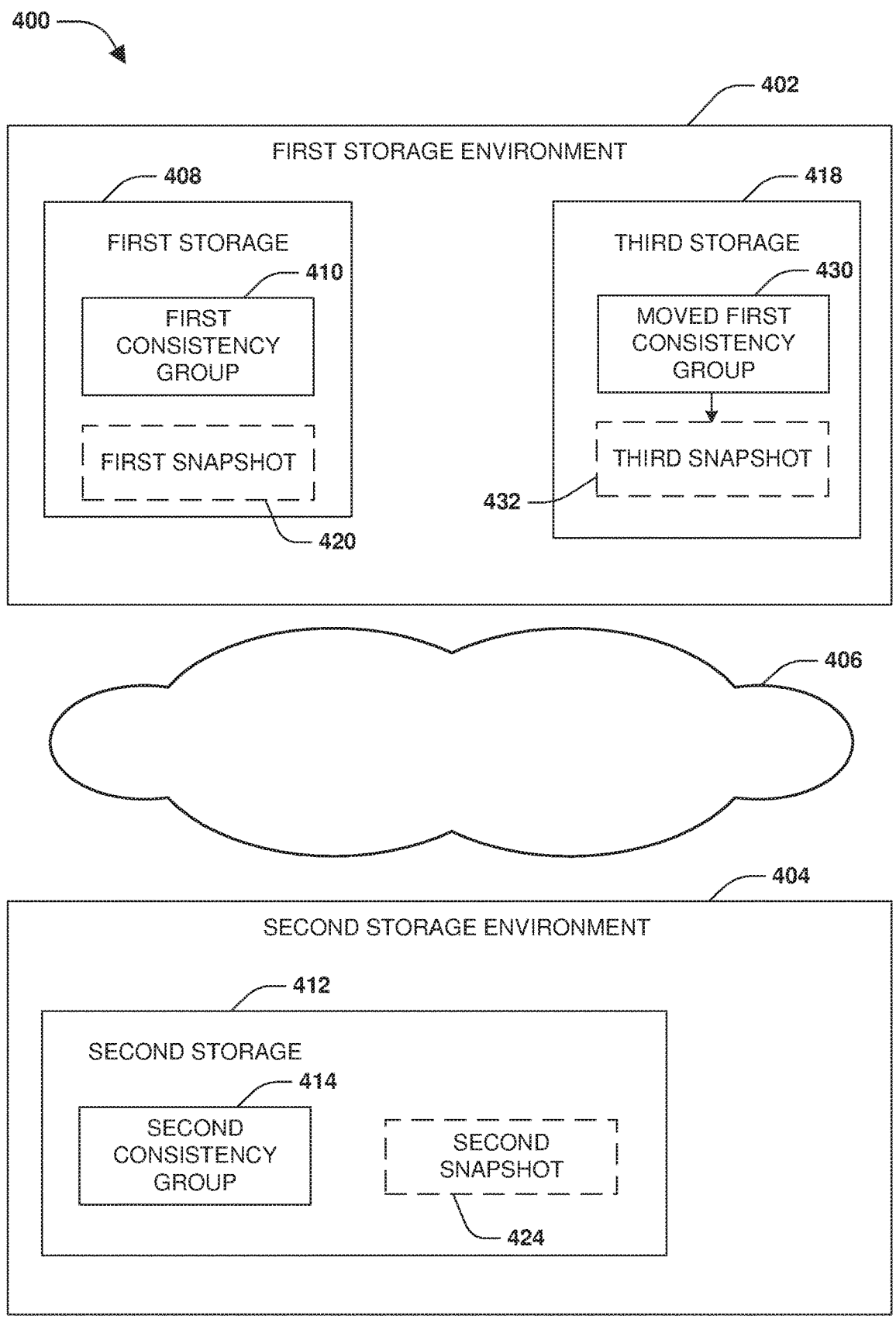
FIG. 4E is a component block diagram illustrating an exemplary computing device for moving a consistency group having a replication relation, where a third snapshot of a moved first consistency group is created.
Figure 4F:
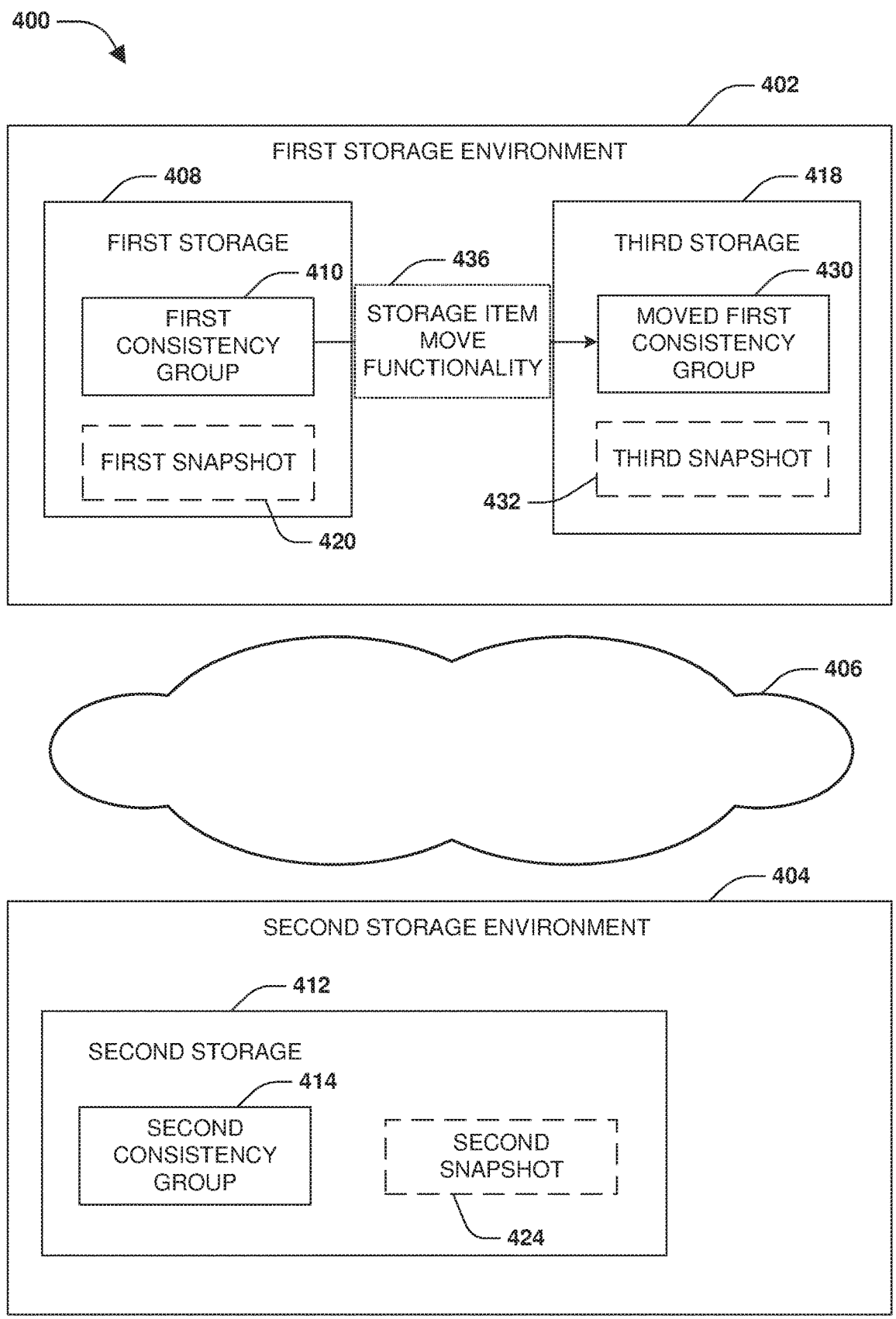
FIG. 4F is a component block diagram illustrating an exemplary computing device for moving a consistency group having a replication relation, where data of a first consistency group is moved into a moved first consistency group.
Figure 4G:
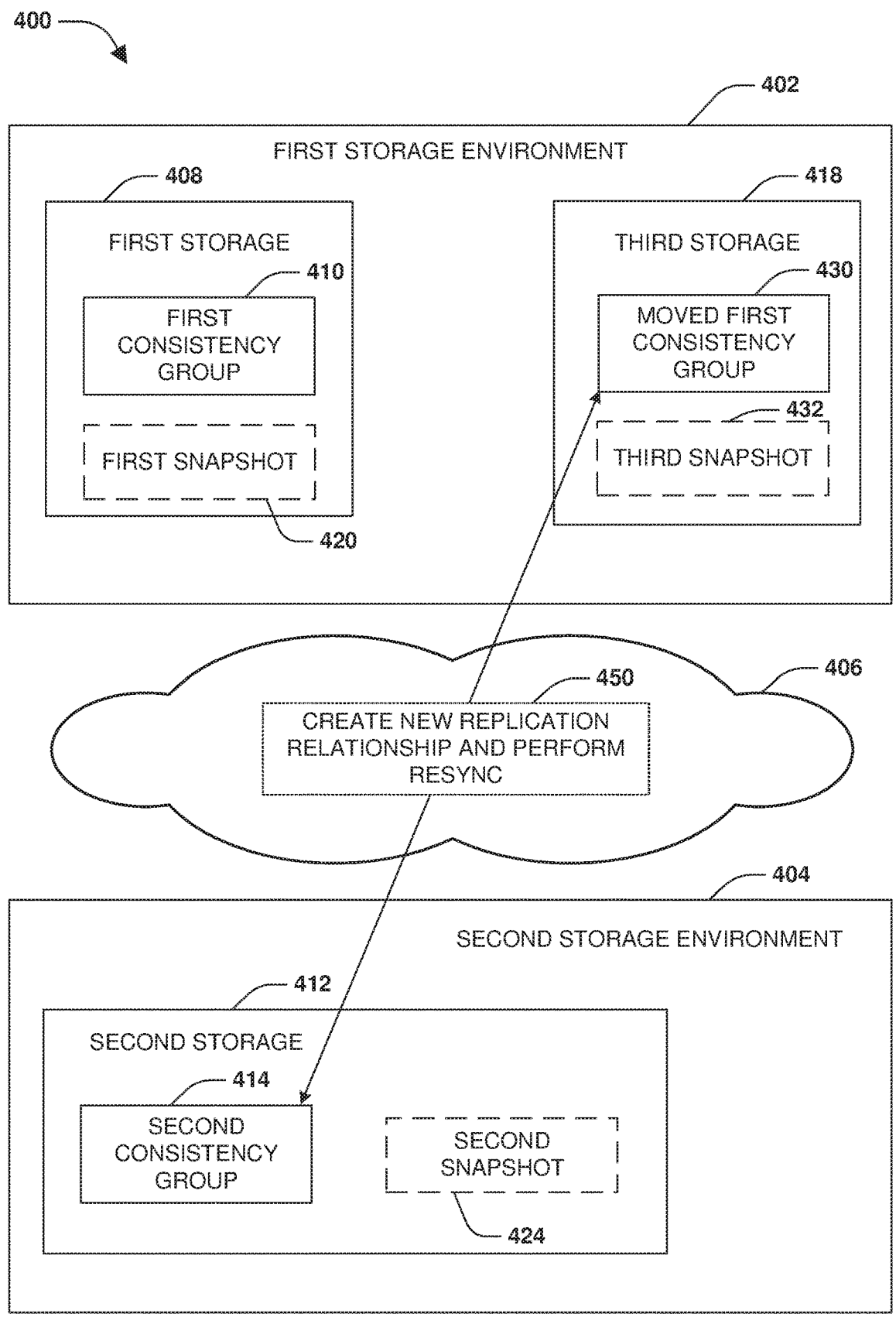
FIG. 4G is a component block diagram illustrating an exemplary computing device for moving a consistency group having a replication relation, where a new replication relationship is established between a moved first consistency group and a second consistency group.

FIG. 4D illustrates single storage item restore functionality 428 (e.g., a single file restore (SFR) command) being utilized to move the first consistency group 410 to the third storage 418 to create a moved first consistency group 430 within the third storage 418. A third snapshot 432 of the moved first consistency group 430 may be created at the third storage 418, as illustrated in FIG. 4E. FIG. 4F illustrates storage item move functionality 436 (e.g., a single file move on demand (SFMOD) command) being utilized to move data of the first consistency group 410 into the moved first consistency group 430 in order to fill files, LUNs, and/or other storage items within the moved first consistency group 430 with data. Client access may be provided to moved data within the moved first consistency group 430 within the third storage 418 (e.g., access may be provided as data is moved into the moved first consistency group 430). FIG. 4G illustrates a new replication relationship 450 being created between the moved first consistency group 430 and the second consistency group 414. The replication relationship 416 between the first consistency group 410 and the second consistency group 414 may be deleted. The third snapshot 432 and the second snapshot 424 may be used to resynchronize the moved first consistency group 430 and the second consistency group 414 (e.g., the snapshots may be used to identify what data is the same or different between the consistency groups) so that the moved first consistency group 430 and the second consistency group 414 comprise the same data and have a synchronous replication relationship.

Figure 5:
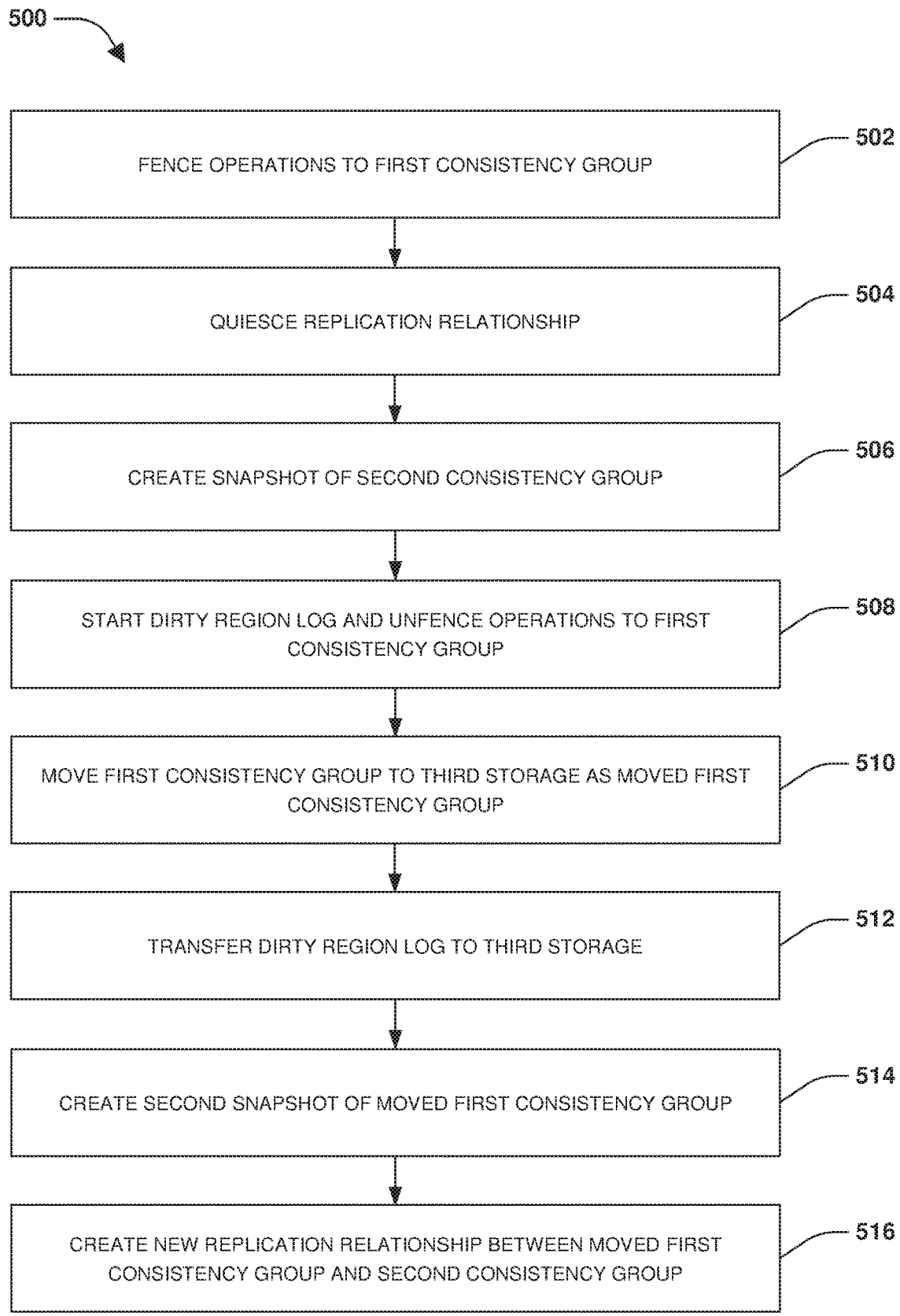
FIG. 5 is a flow chart illustrating an exemplary method of moving a consistency group having a replication relation.

One embodiment of moving a consistency group having a replication relation is illustrated by an exemplary method 500 of FIG. 5. A first consistency group of storage items (e.g., one or more files or LUNs within a volume, within one or more directories of the volume, spanning multiple volumes, or spanning multiple storage controllers) may be hosted within first storage. The first consistency group may have a replication relationship, such as a synchronous replication relationship, with a second consistency group (e.g., the second consistency group may comprise synchronously replicated copies of the files and/or LUNs within the first consistency group) within second storage (e.g., storage hosted by a remote disaster recovery storage controller that is within a different location than a storage controller hosting the first storage).

It may be desirable to move the first consistency group from the first storage to third storage, such as for load or capacity balancing. Accordingly, operations (e.g., I/O operations such as client write operations) to the first consistency group may be fenced (e.g., prohibited from being implemented), at 502. In an example, inflight operations, targeting the first consistency group, may be drained. At 504, the replication relationship may be quiesced so that operations, targeting the first consistency group, are not split and synchronously replicated to the second consistency group. At 506, a snapshot of the second consistency group may be captured. Alternatively, a first snapshot of the first consistency group may be captured, and replicated to the second storage to create the snapshot within the second storage.

At 508, a dirty region log may be started to track operations to the first consistency group, and operations to the first consistency group may be unfenced. In this way, the dirty region log may track dirty regions of storage corresponding to the first consistency group that are modified by operations that are implemented after the snapshot was captured (e.g., dirty data, of a storage item within the first consistency group, may comprise data that is different than data of a replicated copy of the storage item within the second consistency group).

At 510, storage item move functionality (e.g., a single file move on demand (SFMOD) command) may be utilized to move the first consistency group to the third storage as a moved first consistency group. Client access may be provided to moved storage items within the moved first consistency group. For example, responsive to a storage item being moved into the moved first consistency group as a moved storage item, client access to the moved storage item may be provided. A second dirty region log, maintained by the third storage, may be used to track dirty regions of storage corresponding to the moved first consistency group that are modified by operations that are implemented at the third storage. The second dirty region log may be started atomically with providing clients with access to moved storage items within the moved first consistency group. In this way, client access may be cutover from the first consistency group to the moved first consistency group as storage items are moved from the first consistency group to the moved first consistency group. Any changes to data within the moved first consistency group may be captured by the second dirty region log.

Responsive to the first consistency group being moved, the dirty region log may be transferred to the third storage, at 512. In an example, a sync cache may be moved from the first storage to the third storage. The sync cache (e.g., a cache describing how endpoints, such as storage items, are to be synchronously replicated) may be utilized for the moved first consistency group, such as for resynchronization. In another example, an inflight tracker, used to capture inflight operations targeting the first consistency group, may be moved from the first storage to the third storage. The inflight tracker may be utilized for the moved first consistency group, such as for resynchronization.

At 514, a second snapshot of the moved first consistency group may be created. The second snapshot may capture the dirty region log and the second dirty region log. The second snapshot may be marked as a pseudo common snapshot with respect to the snapshot because the second snapshot may captured a similar state of data as the snapshot, and any data differences may be captured within the dirty region log and the second dirty region log. The replication relationship, between the first consistency group and the second consistency group, may be deleted (e.g., the old/stale replication relationship is deleted). At 516, a new replication relationship may be created between the moved first consistency group and the second consistency group. The moved first consistency group and the second consistency group may be resynchronized using the snapshot and the second snapshot (e.g., using the dirty region log and the second dirty region log to identify data differences that will need to be reconciled and resynchronized) so that so that the moved first consistency group and the second consistency group comprise the same data and have a synchronous replication relationship. In an example, the sync cache and/or the inflight tracker may be used for the resynchronization (e.g., used to identify synchronization endpoints, such as storage items, to which data is synchronized, used to identify unsynchronized operations, etc.).

In an example where the first consistency group comprises a cross volume consistency group spanning the first storage, the third storage, and/or other storage, the dirty region log may not need to be copied to the third storage (e.g., because the dirty region log may be directly accessible), the moved first consistency group may be filled more quickly with data from the first consistency group, merely a single snapshot may be captured across both the first storage and the third storage, and/or the resynchronization may be performed sooner.

In an example, the storage item move functionality may be utilized to move the second consistency group from the second storage to fourth storage as a moved second consistency group (e.g., utilizing similar techniques as how the first consistency group was moved to the third storage). A second new replication relationship between the moved first consistency group and the moved second consistency group or between the first consistency group (e.g., if the first consistency group was never moved) and the moved second consistency group may be created. A resynchronization may be performed between the moved first consistency group and the moved second consistency group or between the first consistency group (e.g., if the first consistency group was never moved) and the moved second consistency group.

Figure 6A:
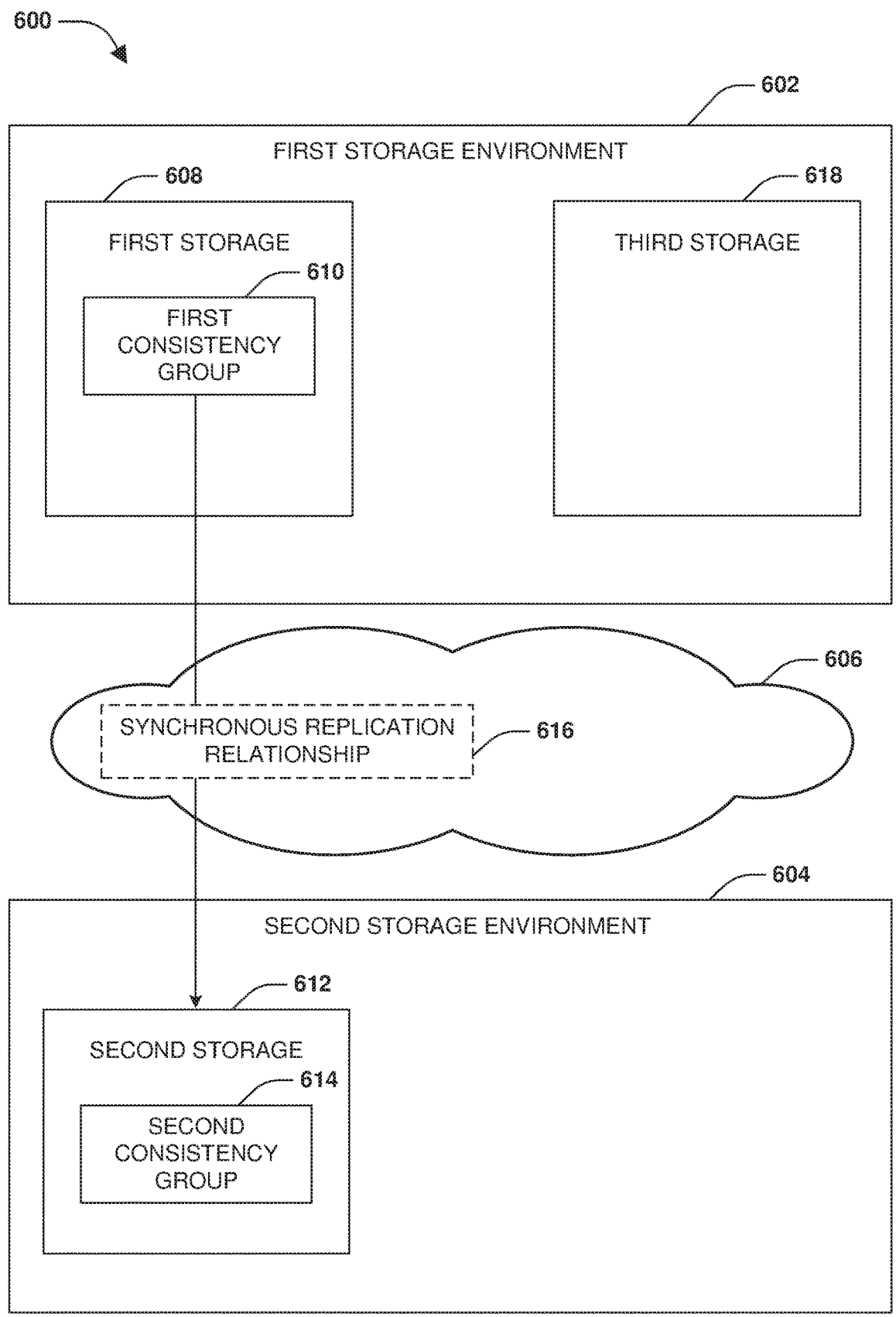
FIG. 6A is a component block diagram illustrating an exemplary computing device for moving a consistency group having a replication relation.

FIGS. 6A-6H illustrate examples of a system 600 for moving a consistency group having a replication relation. FIG. 6A illustrates a first storage environment 602 (e.g., a first data center, a first storage controller, a first cluster of storage controllers, etc.) comprising first storage 608, third storage 618, and/or other storage (e.g., volumes, storage aggregates, storage media, etc.). The first storage 608 may comprise a first consistency group 610 (e.g., one or more files or LUNs within a volume, one or more directories of the volume, across multiple volumes, etc.). The first consistency group 610 may have a synchronous replication relationship 616 with a second consistency group 614 (e.g., the second consistency group 614 comprises synchronous replicated copies of the files or LUns within the first consistency group 610) hosted within second storage 612 comprised within a second storage environment 604 accessible to the first storage environment 602 over a network 606.

Figure 6B:
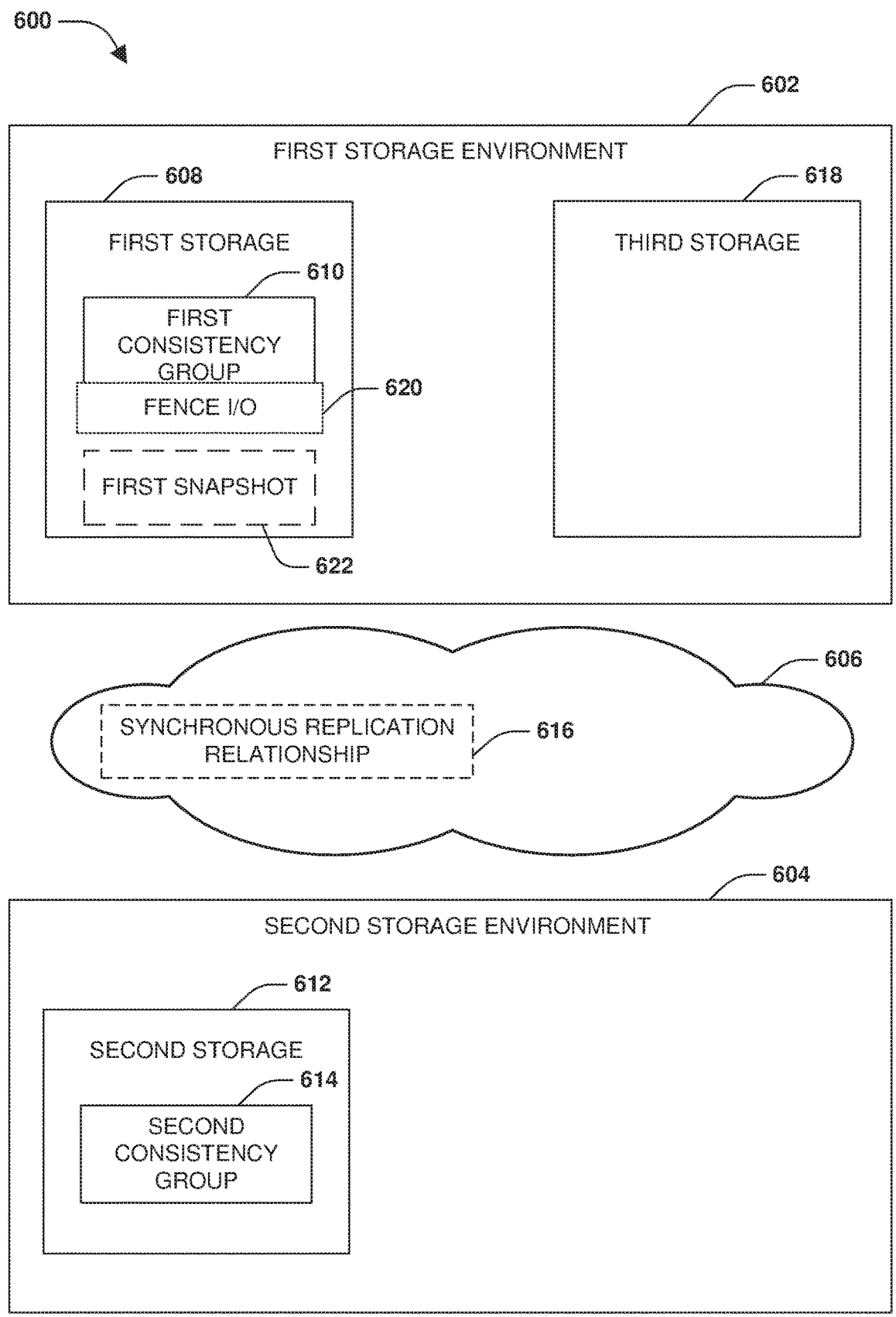
FIG. 6B is a component block diagram illustrating an exemplary computing device for moving a consistency group having a replication relation, where operations to a first consistency group are fenced and a first snapshot of the first consistency group is created.
Figure 6C:
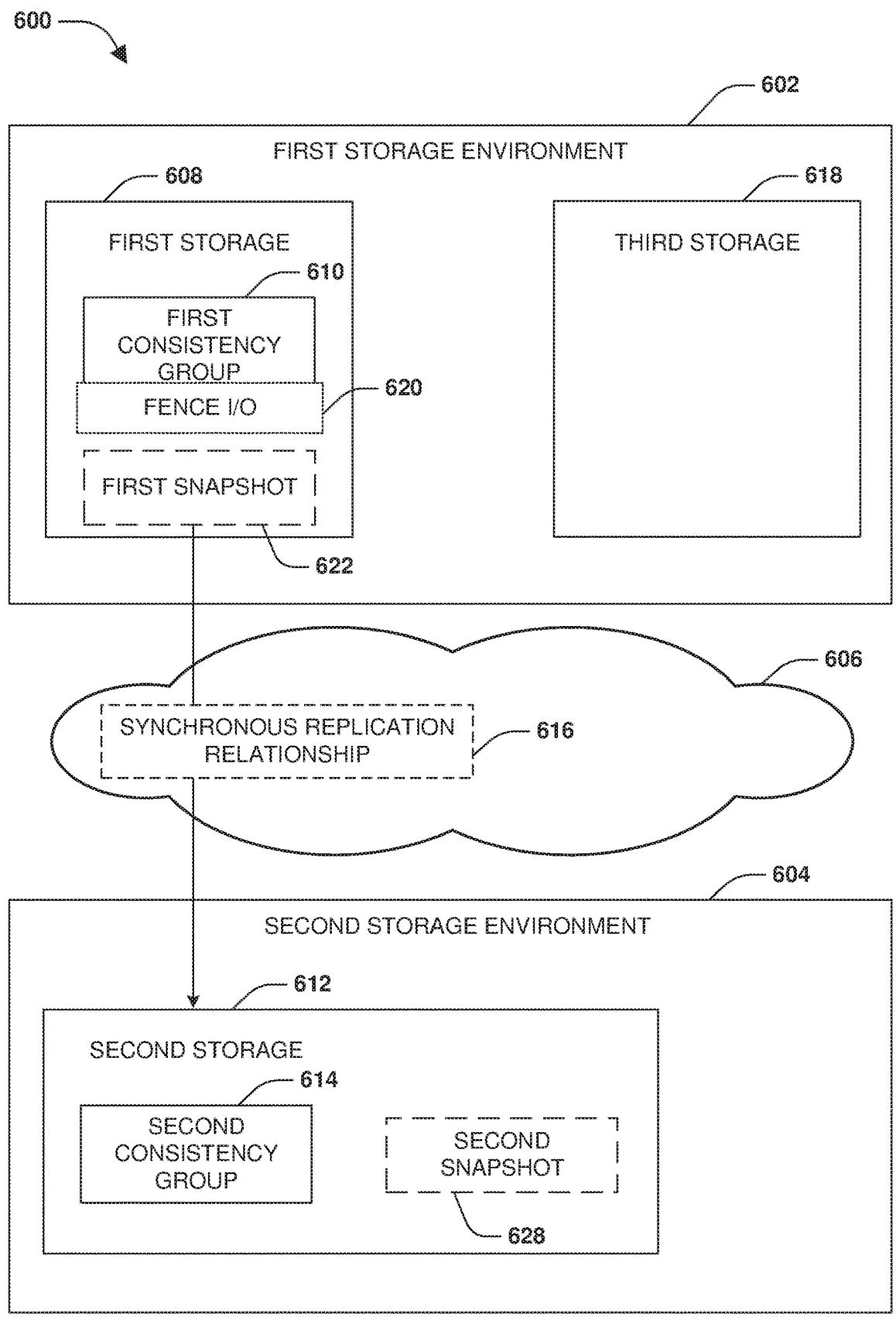
FIG. 6C is a component block diagram illustrating an exemplary computing device for moving a consistency group having a replication relation, where a first snapshot is replicated to second storage.
Figure 6D:
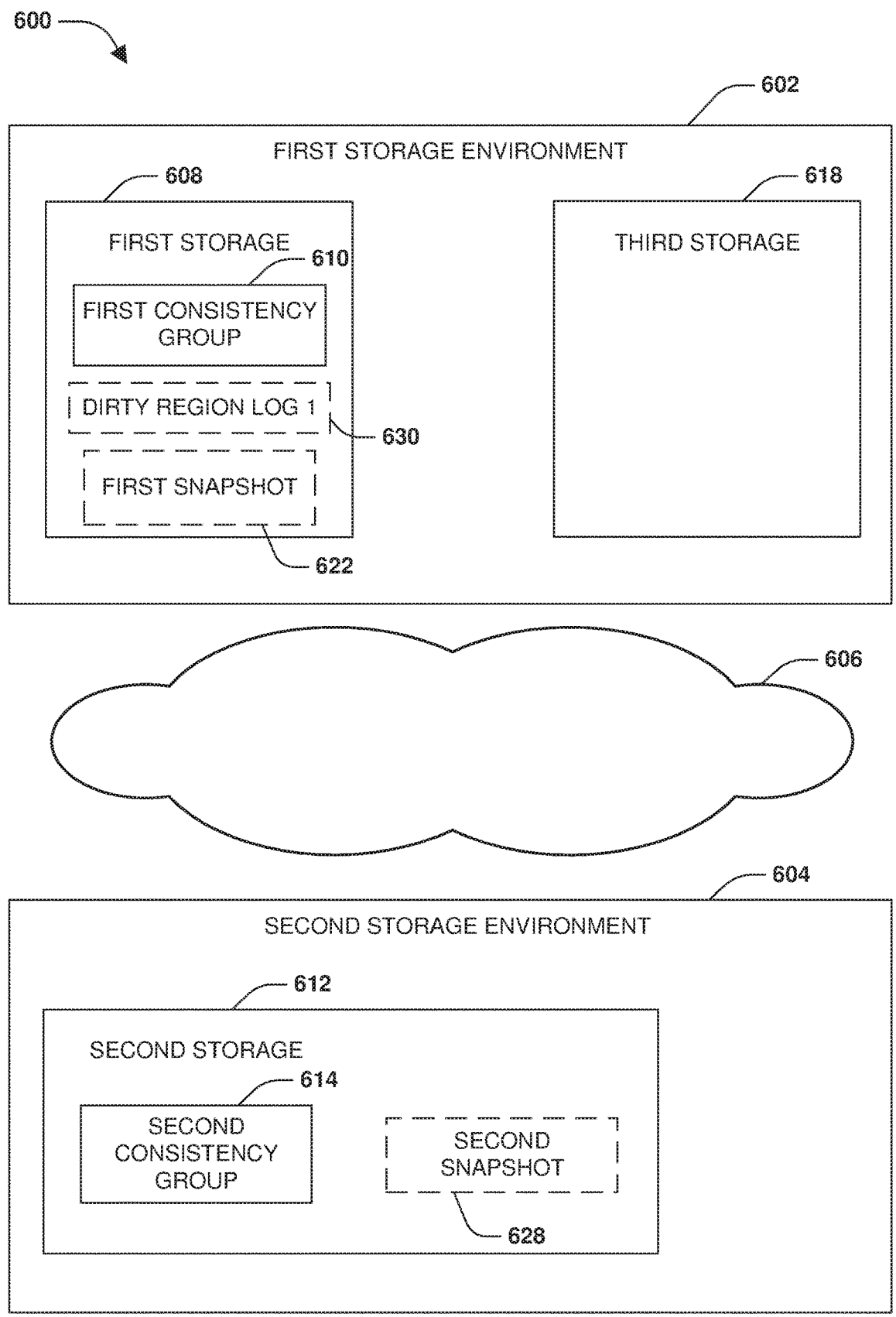
FIG. 6D is a component block diagram illustrating an exemplary computing device for moving a consistency group having a replication relation, where a dirty region log is started.

It may be desirable, such as for capacity or load balancing, to move the first consistency group 610 from the first storage 608 to the third storage 618. Accordingly, operations to the first consistency group 610 may be fenced 620 (e.g., blocked), as illustrated in FIG. 6B. A first snapshot 622 of the first consistency group 610 may be created. FIG. 6C illustrates the first snapshot 622 being replicated to the second storage 612 to create a second snapshot 628. FIG. 6D illustrates a dirty region log (1) 630 being started for tracking operations to the first consistency group 610. In this way, the dirty region log (1) 630 may track dirty regions of storage corresponding to the first consistency group 610 that are modified by operations that are implemented after the first snapshot 622 was captured. The fence 620 may be removed so that operations may be implemented upon the first consistency group 610 and dirty data from such operations may be captured by the dirty region log (1) 630.

In an example, a sync cache may be moved from the first storage 608 to the third storage 618. The sync cache (e.g., a cache describing how endpoints, such as storage items, are to be synchronously replicated) may be utilized for a moved first consistency group 634, such as for resynchronization. In another example, an inflight tracker, used to capture inflight operations targeting the first consistency group 610, may be moved from the first storage 608 to the third storage 618. The inflight tracker may be utilized for the moved first consistency group 634, such as for resynchronization.

Figure 6E:
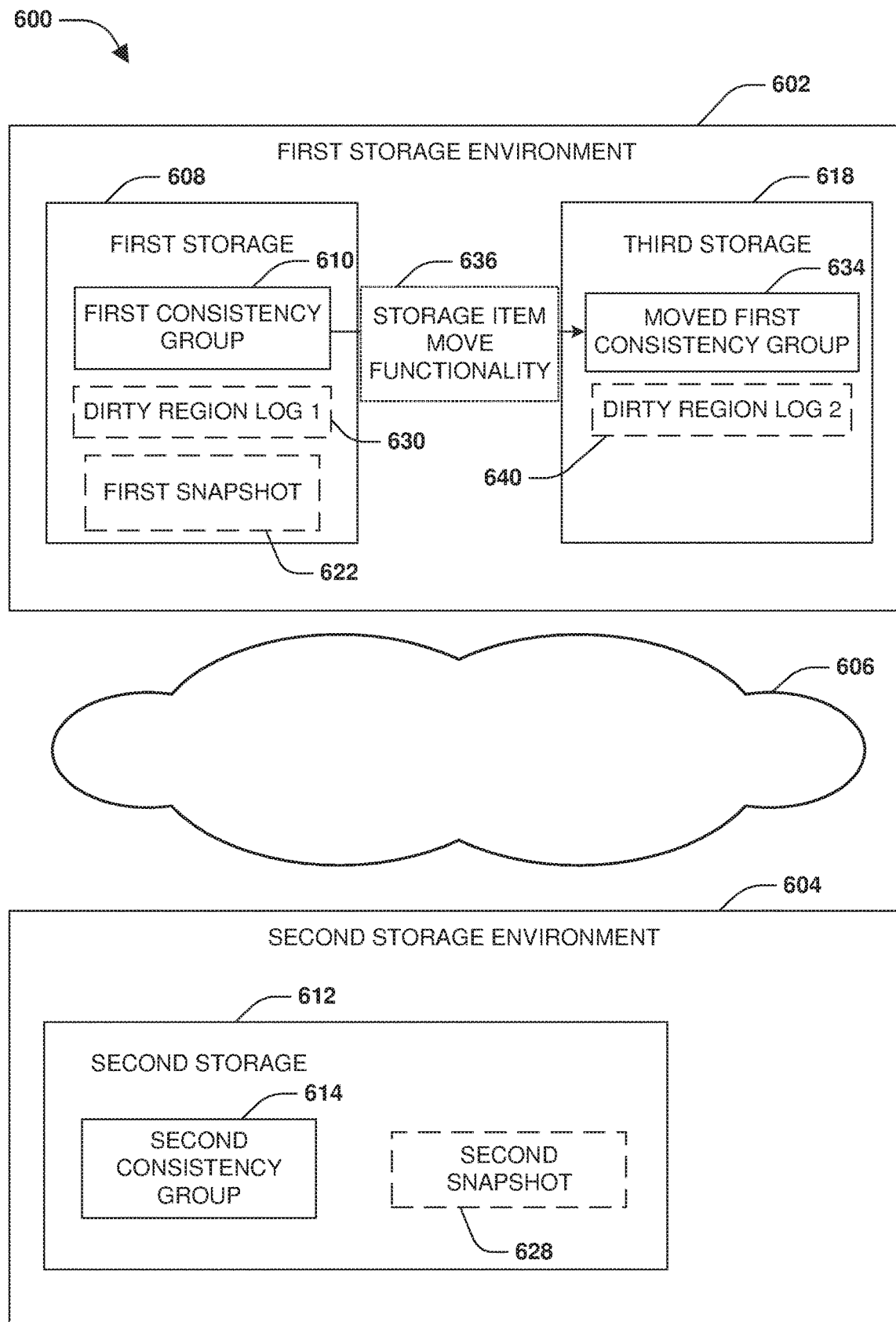
FIG. 6E is a component block diagram illustrating an exemplary computing device for moving a consistency group having a replication relation, where a first consistency group is moved to second storage.
Figure 6F:
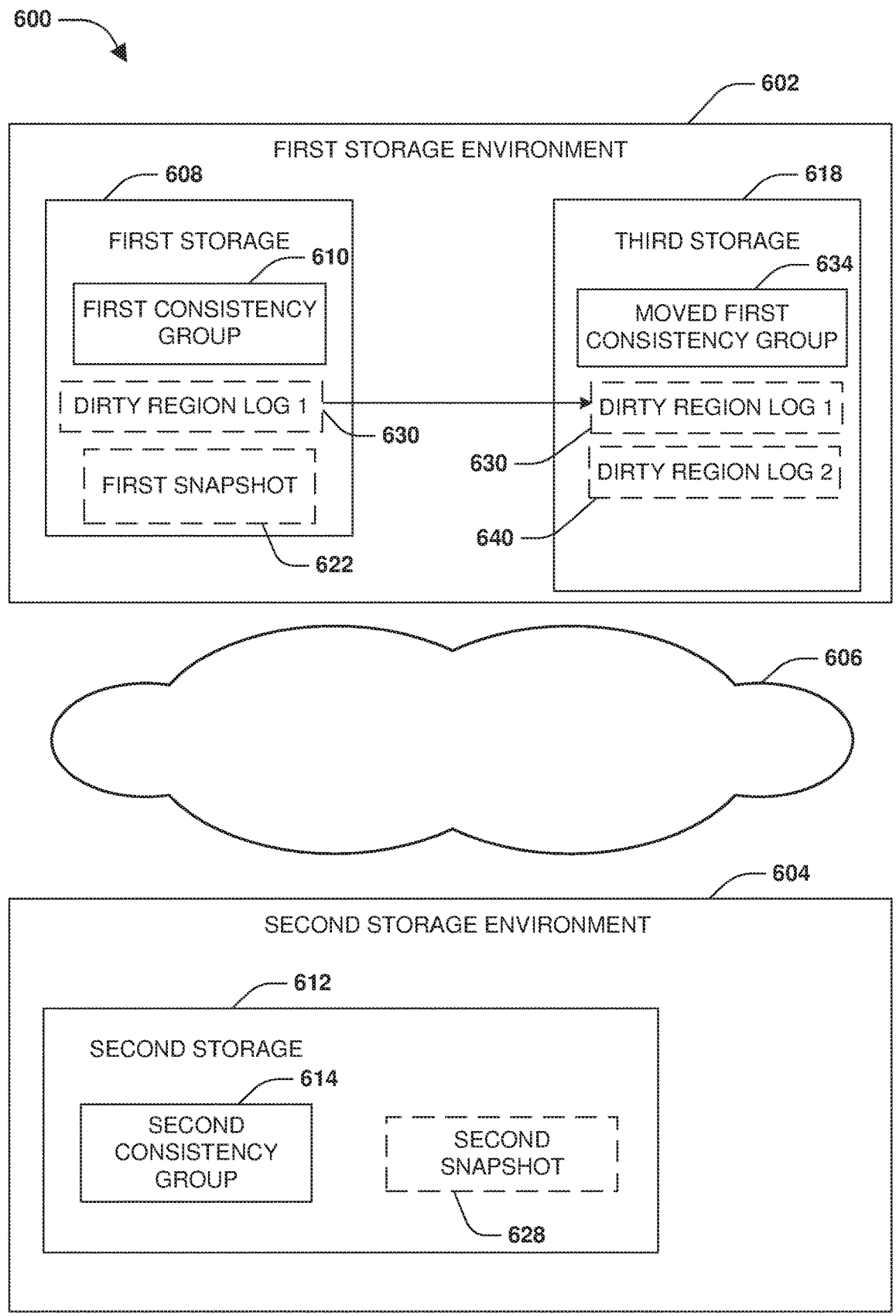
FIG. 6F is a component block diagram illustrating an exemplary computing device for moving a consistency group having a replication relation, where a dirty region log is moved to third storage.

FIG. 6E illustrates storage item move functionality 636 (e.g., a single file move on demand (SFMOD) command) being utilized to move the first consistency group 610 to the third storage 618 as the moved first consistency group 634. Client access may be provided to moved storage items within the moved first consistency group 634 as data is moved into the moved first consistency group 634. A dirty region log (2) 640, maintained at the third storage 618, may be used to track dirty data resulting from the client access. FIG. 6F illustrates the dirty region log (1) 630 being transferred from the first storage 608 to the third storage 618 after the first consistency group 610 has been moved to the third storage 618 as the moved first consistency group 634.

Figure 6G:
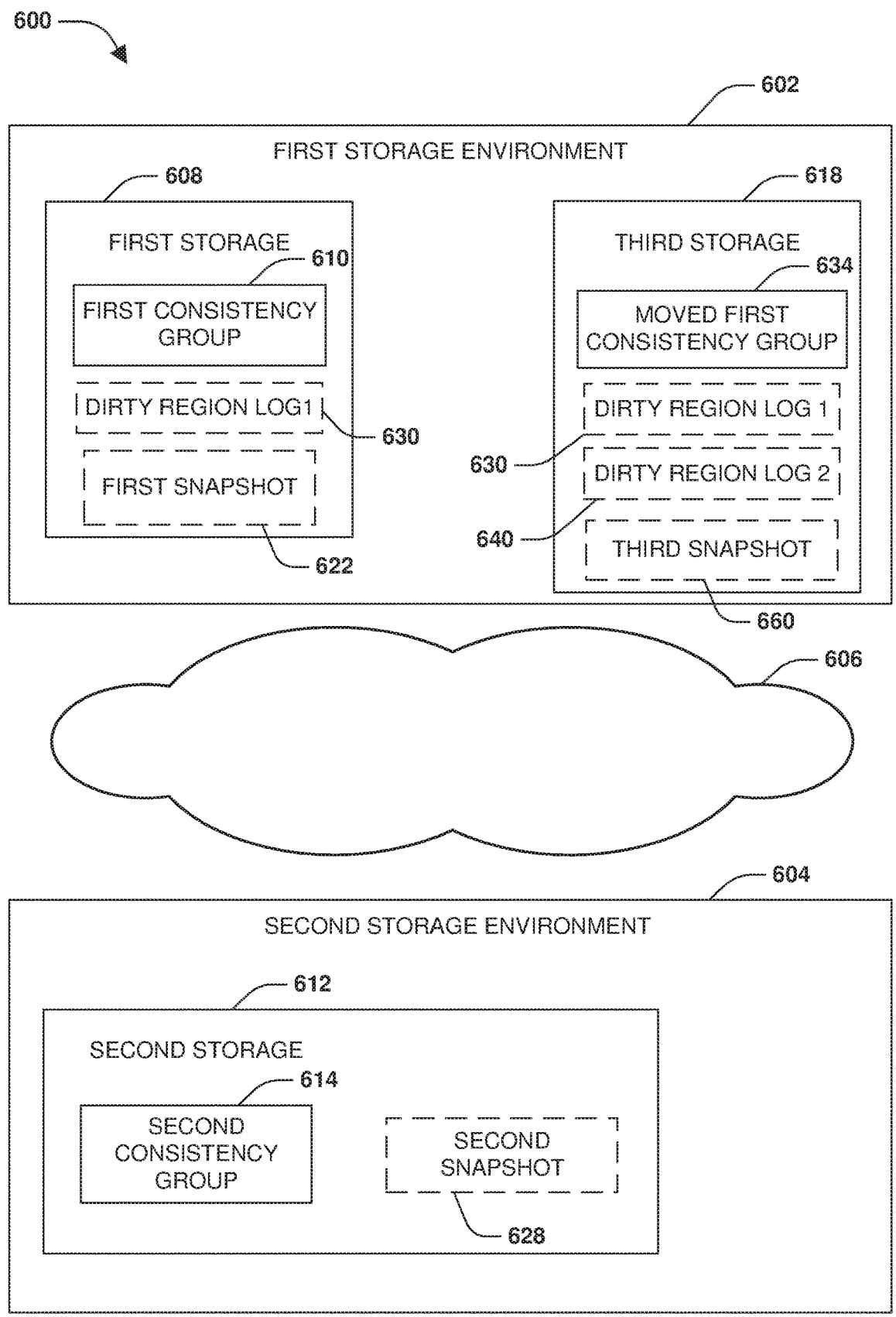
FIG. 6G is a component block diagram illustrating an exemplary computing device for moving a consistency group having a replication relation, where a third snapshot of a moved first consistency group is created.
Figure 6H:
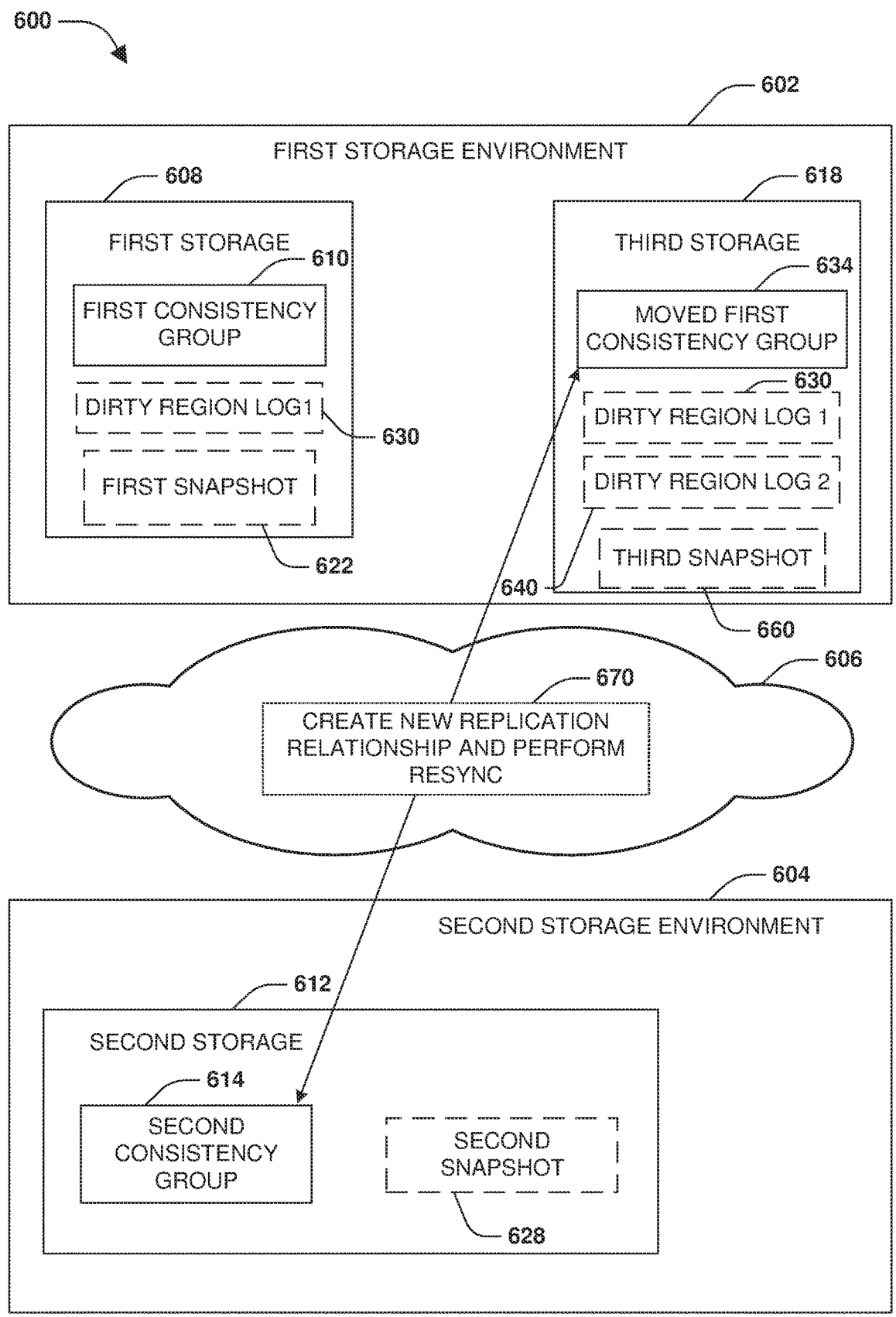
FIG. 6H is a component block diagram illustrating an exemplary computing device for moving a consistency group having a replication relation, where a new replication relationship is established between a moved first consistency group and a second consistency group.

FIG. 6G illustrates a third snapshot 660 of the moved first consistency group 634 being created. The third snapshot 660 may capture the dirty region log (1) 630 and the dirty region log (2) 640. FIG. 6H illustrates a new replication relationship 670 being created between the moved first consistency group 634 and the second consistency group 614. The moved first consistency group 634 and the second consistency group 614 may be resynchronized using the second snapshot 628 and the third snapshot 660 (e.g., using the dirty region log (1) 630 and the dirty region log (2) 640 to identify data differences to reconcile and/or resynchronize) so that so that the moved first consistency group 634 and the second consistency group 614 comprise the same data and have a synchronous replication relationship. In an example, the sync cache and/or the inflight tracker may be used for the resynchronization (e.g., used to identify synchronization endpoints, such as storage items, to which data is synchronized, used to identify unsynchronized operations, etc.). The replication relationship 616, between the first consistency group 610 and the second consistency group 614, may be deleted.

Figure 7:
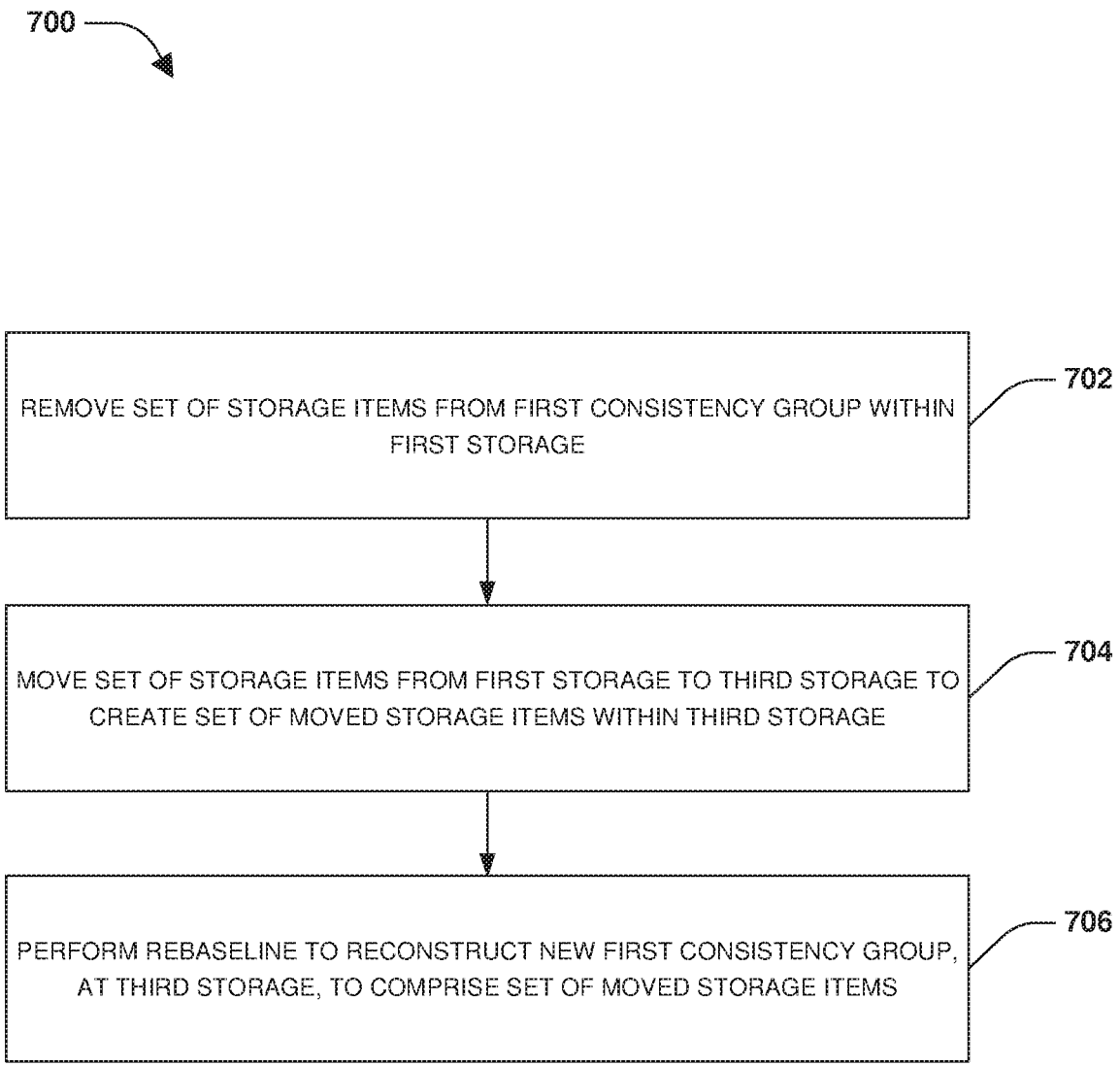
FIG. 7 is a flow chart illustrating an exemplary method of moving a consistency group having a replication relation.

One embodiment of moving a consistency group having a replication relation is illustrated by an exemplary method 700 of FIG. 7. A first consistency group of a set of storage items (e.g., one or more files or LUNs within a volume, within one or more directories of the volume, spanning multiple volumes, or spanning multiple storage controllers) may be hosted within first storage. The first consistency group may have a replication relationship, such as a synchronous replication relationship, with a second consistency group (e.g., the second consistency group may comprise synchronously replicated copies of the files and/or LUNs within the first consistency group) within second storage (e.g., storage hosted by a remote disaster recovery storage controller that is within a different location than a storage controller hosting the first storage).

It may be desirable to move the first consistency group from the first storage to third storage, such as for load or capacity balancing. Accordingly, the set of storage items may be removed from the first consistency group (e.g., unassociated with the first consistency group but remaining within the first storage), at 702. At 704, storage item move functionality (e.g., a single file move on demand (SFMOD) command) may be utilized to move active file system data of the set of storage items from the first storage to the third storage to create a set of moved storage items within the third storage. At 706, a rebaseline may be performed to reconstruct a new first consistency group, at the third storage, to comprise the set of moved storage items. The new first consistency group may be rebaselined to have a new replication relationship with the second consistency group (e.g., a baseline snapshot may be used to transfer data from source storage, such as the second consistency group, to destination storage, such as the moved first consistency group, and/or one or more incremental transfers may be performed using incremental snapshots to transfer delta data from the source storage to the destination storage).

Figure 8A:
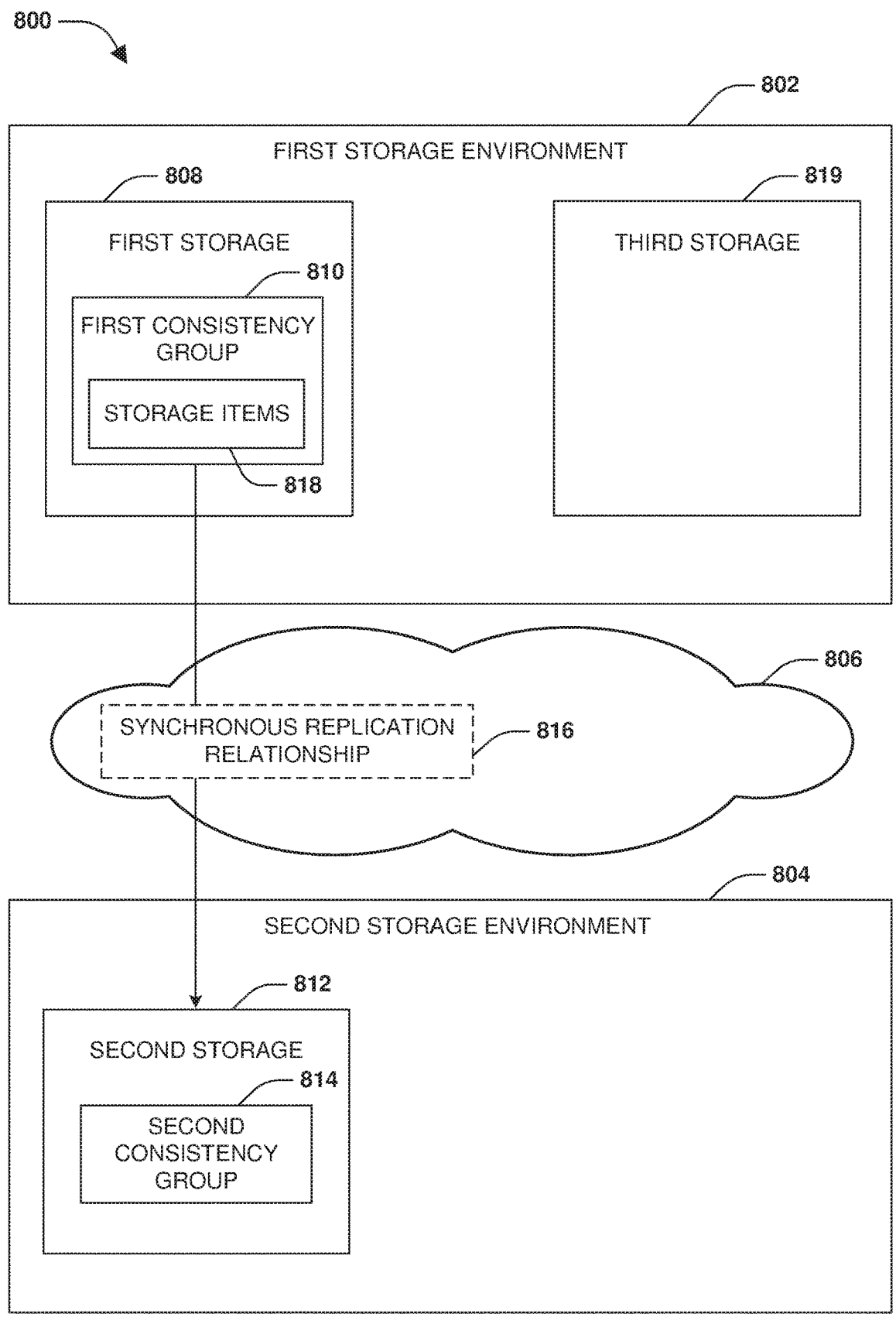
FIG. 8A is a component block diagram illustrating an exemplary computing device for moving a consistency group having a replication relation.

FIGS. 8A-8D illustrate examples of a system 800 for moving a consistency group having a replication relation. FIG. 8A illustrates a first storage environment 802 (e.g., a first data center, a first storage controller, a first cluster of storage controllers, etc.) comprising first storage 808, third storage 819, and/or other storage (e.g., volumes, storage aggregates, storage media, etc.). The first storage 808 may comprise a first consistency group 810 comprising a set of storage items 818 (e.g., one or more files or LUNs within a volume, one or more directories of the volume, across multiple volumes, etc.). The first consistency group 810 may have a synchronous replication relationship 816 with a second consistency group 814 (e.g., the second consistency group 814 comprises synchronously replicated copies of the files or LUNs within the first consistency group 810) hosted within second storage 812 comprised within a second storage environment 804 accessible to the first storage environment 802 over a network 806.

Figure 8B:
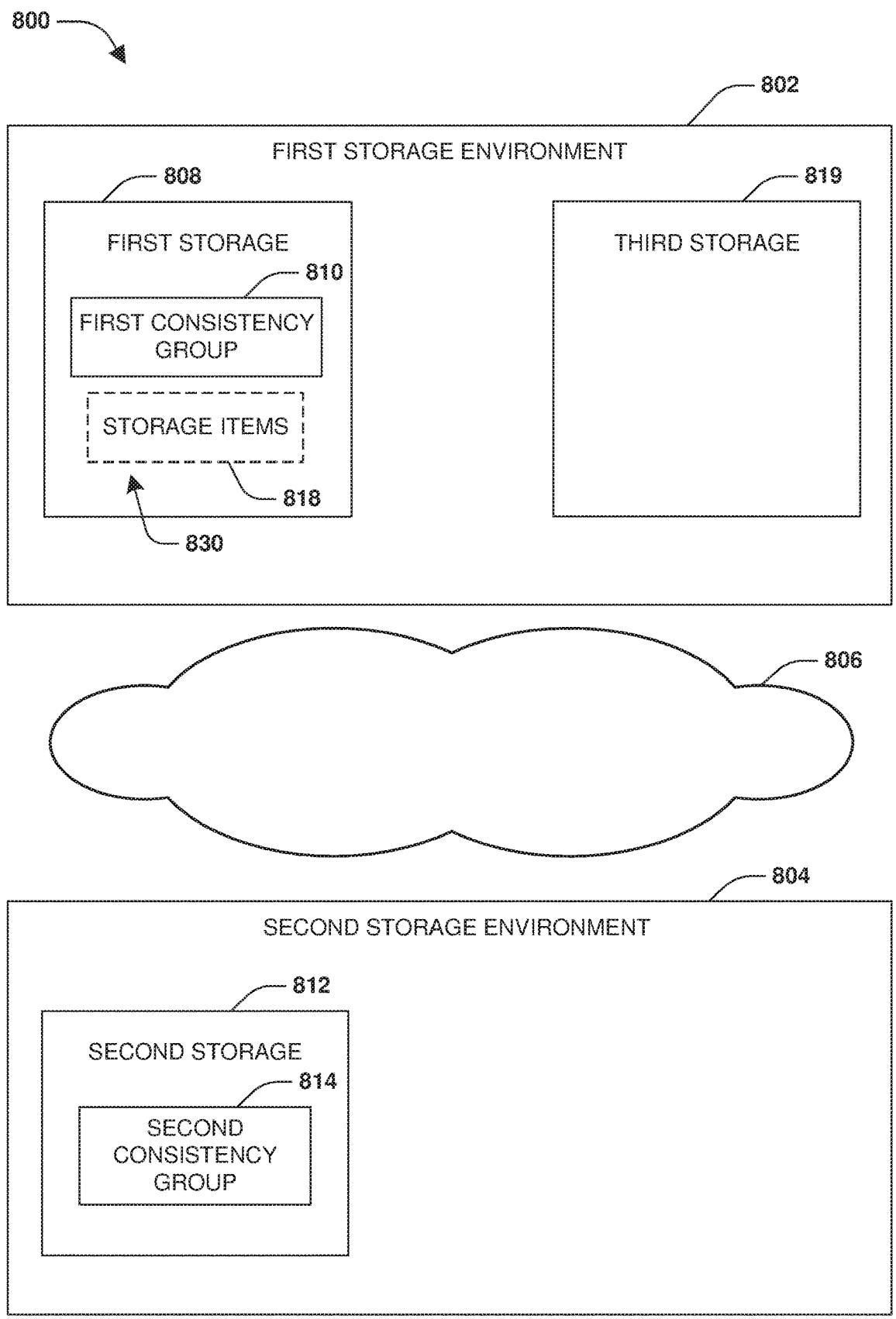
FIG. 8B is a component block diagram illustrating an exemplary computing device for moving a consistency group having a replication relation, where a set of storage items are removed from a first consistency group.
Figure 8C:
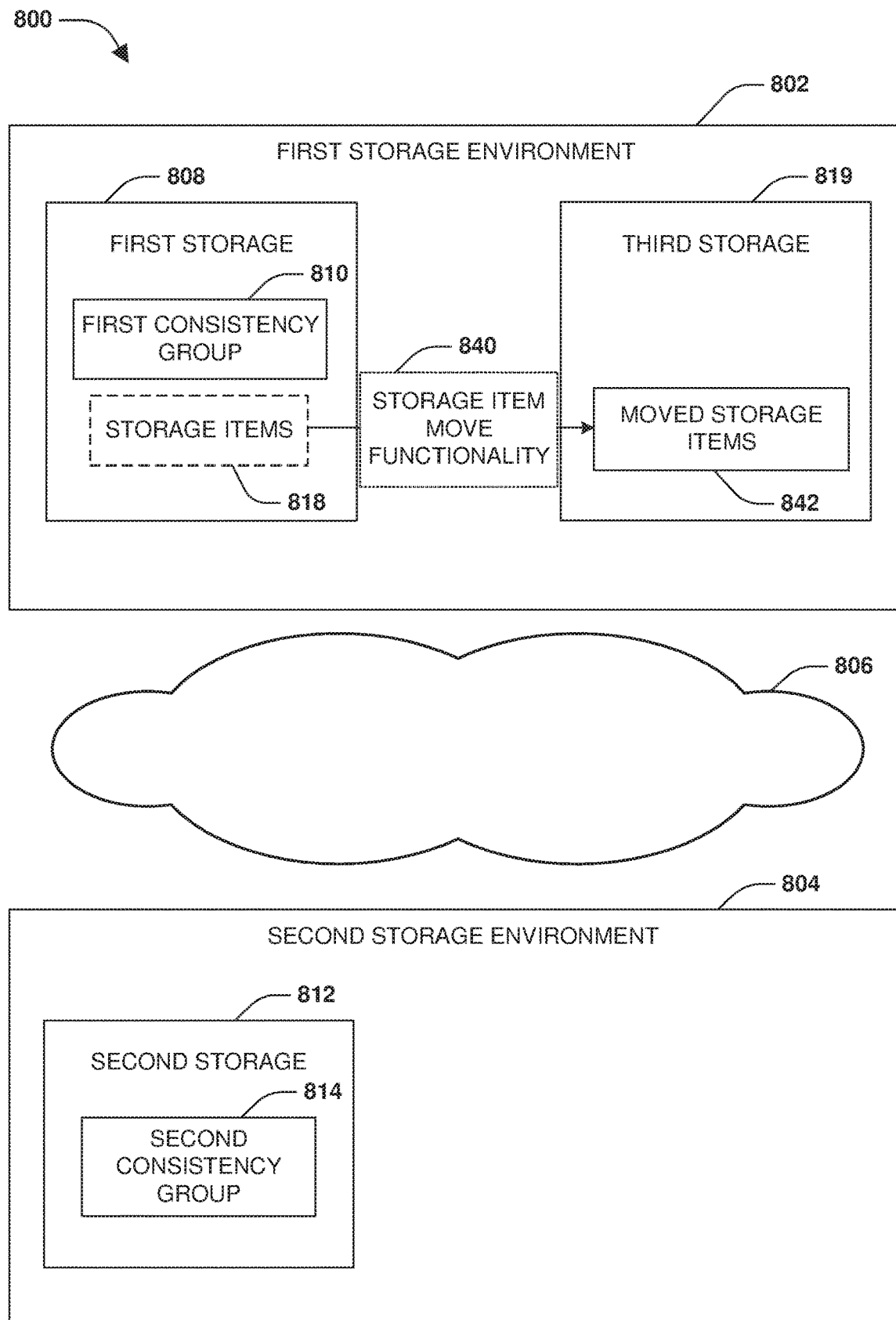
FIG. 8C is a component block diagram illustrating an exemplary computing device for moving a consistency group having a replication relation, where a set of storage items are moved to third storage.
Figure 8D:
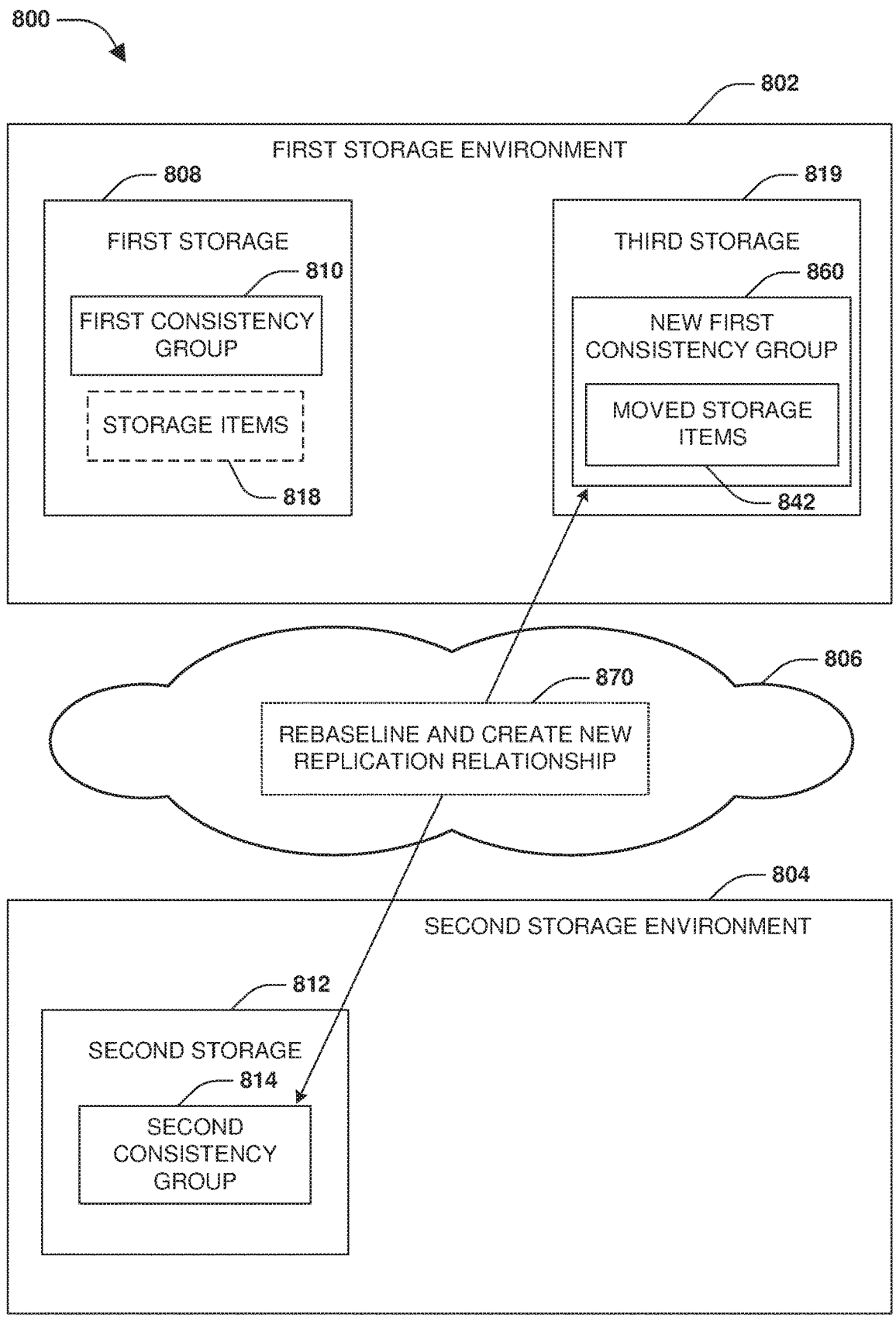
FIG. 8D is a component block diagram illustrating an exemplary computing device for moving a consistency group having a replication relation, where a new replication relationship is established between a new first consistency group and a second consistency group.

It may be desirable, such as for capacity or load balancing, to move the first consistency group 810 from the first storage 808 to the third storage 819. Accordingly, the set of storage items 818 may be removed 830 from the first consistency group 810 (e.g., unassociated with the first consistency group 810 but remaining within the first storage 808), as illustrated in FIG. 8B. FIG. 8C illustrates storage item move functionality 840 (e.g., a single file move on demand (SFMOD) command) being utilized to move active file system data of the set of storage items 818 from the first storage 808 to the third storage 819 to create a set of moved storage items 842 within the third storage 819. FIG. 8D illustrates a rebaseline 870 being performed to construct a new first consistency group 860, at the third storage 819, to comprise the set of moved storage items 842. The new first consistency group 860 may be rebaselined 870 to have a new replication relationship with the second consistency group 814 (e.g., a baseline snapshot may be used to transfer data from source storage, such as the second consistency group 814, to destination storage, such as the new first consistency group 860, and/or one or more incremental transfers may be performed using incremental snapshots to transfer delta data from the source storage to the destination storage).

Figure 9:
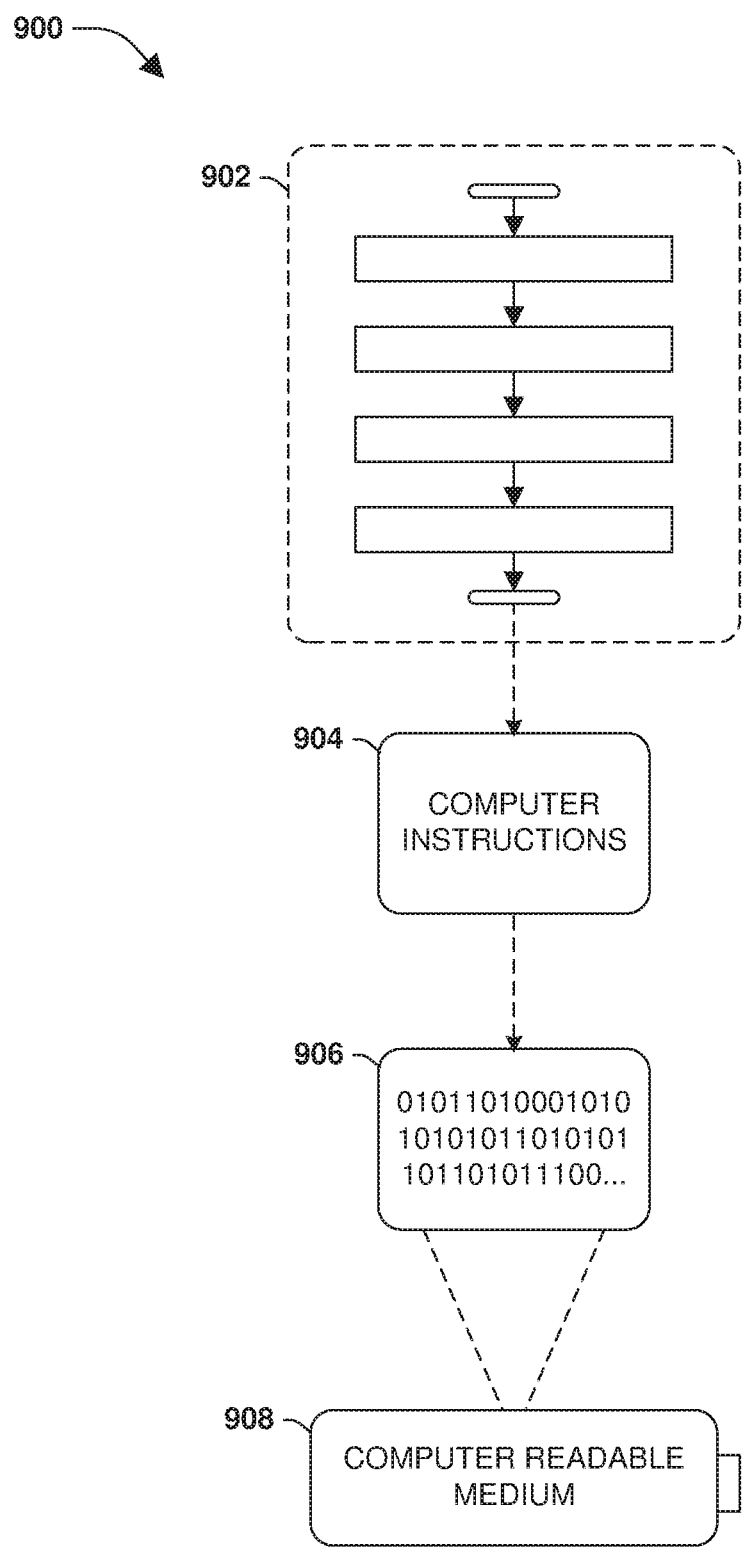
FIG. 9 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a CD-ft DVD-R, flash drive, a platter of a hard disk drive, etc., on which is encoded computer-readable data 906. This computer-readable data 906, such as binary data comprising at least one of a zero or a one, in turn comprises a processor-executable computer instructions 904 configured to operate according to one or more of the principles set forth herein. In some embodiments, the processor-executable computer instructions 904 are configured to perform a method 902, such as at least some of the exemplary method 300 of FIG. 3, at least some of the exemplary method 500 of FIG. 5, and/or at least some of the exemplary method 700 of FIG. 7, for example. In some embodiments, the processor-executable computer instructions 904 are configured to implement a system, such as at least some of the exemplary system 400 of FIGS. 4A-4G, at least some of the exemplary system 600 of FIGS. 6A-6H, and/or at least some of the exemplary system 800 of FIGS. 8A-8D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    in response to operations targeting a first consistency group being fenced, creating a snapshot of a second consistency group having a replication relationship with the first consistency group;
    unfencing the operations and utilizing a dirty region log to track dirty data resulting from the operations being implemented;
    utilizing storage item move functionality to move the first consistency group as a moved first consistency group;
    utilizing a second dirty region log to track dirty data resulting from client access to the moved first consistency group; and
    utilizing the dirty region log, the second dirty region log, the snapshot, a sync cache describing how endpoints are synchronously replicated, and an inflight tracker used to capture inflight operations targeting the first consistency group to resynchronize the moved first consistency group and the second consistency group, wherein the dirty region log and the second dirty region log are compared to identify data differences to reconcile during the resynchronization, and wherein the sync cache and inflight tracker are used to identify unsynchronized operations not synchronized to the endpoints identified by the sync cache.

2. The method of claim 1, wherein the first consistency group is moved to first storage as the moved first consistency group.

3. The method of claim 2, wherein the second dirty region log is stored within the first storage.

4. The method of claim 2, comprising:
    transferring the dirty region log to the first storage.

5. The method of claim 1, comprising:
    creating a second snapshot of the moved first consistency group, wherein the second snapshot captures the dirty region log and the second dirty region log.

6. The method of claim 1, comprising:
    draining inflight operations, targeting the first consistency group, before creating the snapshot.

7. The method of claim 1, comprising:
    creating a new replication relationship between the moved first consistency group and the second consistency group.

8. The method of claim 1, comprising:
    creating the snapshot in response to quiescing the replication relationship.

9. A non-transitory machine readable medium having stored thereon machine executable code, which when executed by a machine, causes the machine to:
    in response to operations targeting a first consistency group being fenced, create a snapshot of a second consistency group having a replication relationship with the first consistency group;

unfence the operations and utilizing a dirty region log to track dirty data resulting from the operations being implemented;

utilize storage item move functionality to move the first consistency group as a moved first consistency group;

utilize a second dirty region log to track dirty data resulting from client access to the moved first consistency group; and utilize the dirty region log, the second dirty region log, the snapshot, a sync cache describing how endpoints are synchronously replicated, and an inflight tracker used to capture inflight operations targeting the first consistency group to resynchronize the moved first consistency group and the second consistency group, wherein the dirty region log and the second dirty region log are compared to identify data differences to reconcile during the resynchronization, and wherein the sync cache and inflight tracker are used to identify unsynchronized operations not synchronized to the endpoints identified by the sync cache.

10. The non-transitory machine readable medium of claim 9, wherein the machine executable code causes the machine to:

drain inflight operations, targeting the first consistency group, before creating the snapshot.

11. The non-transitory machine readable medium of claim 9, wherein the machine executable code causes the machine to:

quiesce the replication relationship so that operations, targeting the first consistency group, are not split and synchronously replicated to the second consistency group.

12. The non-transitory machine readable medium of claim 9, wherein the machine executable code causes the machine to:

cutover client access from the first consistency group to the moved first consistency group as storage items are moved from the first consistency group to the moved first consistency group.

13. The non-transitory machine readable medium of claim 9, wherein the machine executable code causes the machine to:

create a second snapshot of the moved first consistency group, wherein the second snapshot captures the dirty region log and the second dirty region log.

14. The non-transitory machine readable medium of claim 13, wherein the machine executable code causes the machine to:

mark the second snapshot as a pseudo common snapshot.

15. The non-transitory machine readable medium of claim 9, wherein the machine executable code causes the machine to:

create a new replication relationship between the moved first consistency group and the second consistency group.

16. The non-transitory machine readable medium of claim 15, wherein the machine executable code causes the machine to:

delete the replication relationship between the first consistency group and the second consistency group.

17. The non-transitory machine readable medium of claim 9, wherein the machine executable code causes the machine to:

move the sync cache for utilization by the moved first consistency group.

18. The non-transitory machine readable medium of claim 9, wherein the machine executable code causes the machine to:

move the inflight tracker for utilization by the moved first consistency group, wherein the inflight tracker captures inflight operations targeting the first consistency group.

19. A computing device comprising:

a memory comprising machine executable code; and a processor coupled to the memory, the processor configured to execute the machine executable code to cause the processor to:

in response to operations targeting a first consistency group being fenced, create a snapshot of a second consistency group having a replication relationship with the first consistency group;

unfence the operations and utilizing a dirty region log to track dirty data resulting from the operations being implemented;

utilize storage item move functionality to move the first consistency group as a moved first consistency group;

utilize a second dirty region log to track dirty data resulting from client access to the moved first consistency group; and utilize the dirty region log, the second dirty region log, the snapshot, a sync cache describing how endpoints are synchronously replicated, and an inflight tracker used to capture inflight operations targeting the first consistency group to resynchronize the moved first consistency group and the second consistency group, wherein the dirty region log and the second dirty region log are compared to identify data differences to reconcile during the resynchronization, and wherein the sync cache and inflight tracker are used to identify unsynchronized operations not synchronized to the endpoints identified by the sync cache.

20. The computing device of claim 19, wherein the machine executable code cases the processor to:

create a new replication relationship between the moved first consistency group and the second consistency group.

* * * * *